(12) United States Patent
Mitsuhashi

(10) Patent No.: US 11,796,777 B2
(45) Date of Patent: Oct. 24, 2023

(54) ZOOM LENS AND IMAGING APPARATUS

(71) Applicant: TAMRON CO., LTD., Saitama (JP)

(72) Inventor: Takahiro Mitsuhashi, Saitama (JP)

(73) Assignee: TAMRON CO., LTD., Saitama (JP)

( * ) Notice: Subject to any disclaimer, the term of this patent is extended or adjusted under 35 U.S.C. 154(b) by 515 days.

(21) Appl. No.: 17/098,948

(22) Filed: Nov. 16, 2020

(65) Prior Publication Data

US 2021/0333525 A1     Oct. 28, 2021

(30) Foreign Application Priority Data

Apr. 27, 2020   (JP) ................................. 2020-078385

(51) Int. Cl.
  *G02B 15/14*    (2006.01)
  *G02B 15/16*    (2006.01)

(52) U.S. Cl.
  CPC ..... *G02B 15/145121* (2019.08); *G02B 15/16* (2013.01)

(58) Field of Classification Search
  CPC ............ G02B 15/08; G02B 15/145121; G02B 15/145125; G02B 15/16; G02B 15/20; G02B 27/0025
  See application file for complete search history.

(56) References Cited

U.S. PATENT DOCUMENTS

| | | |
|---|---|---|
| 7,656,589 B2 | 2/2010 | Bito et al. |
| 7,952,810 B2 | 5/2011 | Bito et al. |
| 7,952,812 B2 | 5/2011 | Bito et al. |
| 8,830,597 B2 | 9/2014 | Hagiwara |
| 2017/0031140 A1* | 2/2017 | Tomioka ........ G02B 15/143105 |

FOREIGN PATENT DOCUMENTS

| | | |
|---|---|---|
| JP | 2008-176229 A | 7/2008 |
| JP | 2013-195749 A | 9/2013 |
| WO | WO 2013/151153 A1 | 10/2013 |

* cited by examiner

*Primary Examiner* — Joseph P Martinez
*Assistant Examiner* — Vipin Patel
(74) *Attorney, Agent, or Firm* — Paratus Law Group, PLLC

(57) ABSTRACT

A zoom lens includes a first lens group having a positive refractive power, a second lens group having a negative refractive power, and a rear group having a positive refractive power as a whole in order from an object side. The zoom lens has specific optical characteristics indicated by two expressions.

11 Claims, 21 Drawing Sheets

ZOOM LENS AND IMAGING APPARATUS

CROSS-REFERENCE TO RELATED APPLICATIONS

This application is based on and claims the benefit of priority from Japanese Patent Application No. 2020-078385, filed on Apr. 27, 2020, the entire contents of which are incorporated herein by reference.

BACKGROUND OF THE INVENTION

Technical Field

The present invention relates to a zoom lens and an imaging apparatus.

Related Art

In a zoom lens of the related art, mirrorless cameras, digital still cameras, security cameras, and the like have been known to have a high magnification.

For example, a zoom lens system is which signs of refractive indices of lens groups are positive, negative, positive, positive, and positive in order from as object side has been known as the zoom lens (see, for example, JP 2008-176229 A).

An imaging lens in which signs of refractive indices of lens groups are positive, negative, positive, positive, and positive or are positive, negative, positive, positive, and negative in order from the object side has been known (see, for example, WO2013/151153A).

A zoom lens in which signs of refractive indices of lens groups are positive, negative, positive, negative, and positive in order from the object side has been known (see, for example, JP 2013-195749 A).

As the number of pixels of a solid-state image sensor mounted on the camera has increased in recent years, the zoom lens needs to have higher performance than before. In particular, a high-magnification zoom lens needs to have high performance usable for multiple purposes.

A zoom magnification of the zoom lens system described in JP 2008-176229 A becomes low, and it is difficult to maintain a clearance between the lens groups as the magnification is increased. Thus, it is difficult to achieve imaging at the shortest imaging distance and high optical performance at this time.

In the imaging lens described in WO2013/151153A, since a variable magnification ratio using a second lens group is small, an amount of movement of the second lens group is large, and a moving region of a focus group is correspondingly small. Thus, it is difficult to perform imaging at the shortest imaging distance and maintain the performance at this time.

Since the zoom lens described in JP 2013-195749 A has a small variable magnification ratio using the second lens group, a third lens group is also moved in order to achieve a high magnification of the zoom lens. However, the moving region of the focus group is correspondingly small, and thus, it is difficult to perform imaging at the shortest imaging distance and maintain the performance at this time.

As described above, it is difficult to perform aberration correction for shortening the shortest imaging distance and maintaining the performance as the magnification of the zoom lens is increased.

The present invention has been made in view of the above-mentioned problems, and an aspect of the present invention is to provide a zoom lens and an imaging apparatus that have a high magnification, are capable of shortening the shortest imaging distance, and have high optical performance.

SUMMARY OF THE INVENTION

In order to solve the above-mentioned problems, a zoom lens according to an aspect of the present invention is a zoom lens that includes a first lens group having a positive refractive power, a second lens group having a negative refractive power, and a rear group having a positive refractive power as a whole in order from an object side, and performs a variable magnification operation by changing a distance between the lens groups adjacent to each other. The rear group includes at least a third lens group, a fourth lens group, and a fifth lens group in order from the object side, any one lens group of the third lens group, the fourth lens group, or the fifth lens group is a focus group that performs focusing by moving on an optical axis, and the zoom lens satisfies a following expression:

$$0.3 \leq |f_f|/M < 0.8 \quad (1)$$

$$1.5 \leq \beta_{FW}/\beta_{FT} < 7.0 \quad (2)$$

where

M is a square root of a product of $f_w$ and $f_t$,
$f_f$ is a focal length of the focus group,
$f_w$ is a focal length at a wide-angle end of the zoom lens at infinity focusing,
$f_t$ is a focal length at a telephoto end of the zoom lens at infinity focusing,
$\beta_{FW}$ is a lateral magnification at a wide-angle end of the focus group, and
$\beta_{FT}$ is a lateral magnification at a telephoto end of the focus group.

In order to solve the above-mentioned problems, an imaging apparatus according to another aspect of the present invention includes the zoom lens, and an image sensor that is provided on an image side of the zoom lens to convert an optical image formed by the zoom lens into an electrical signal.

According to the aspect of the present invention, it is possible to provide a zoom lens and an imaging apparatus which have a high magnification, are capable of shortening the shortest imaging distance, and have high optical performance.

DESCRIPTION OF THE EMBODIMENTS

Figure 1:
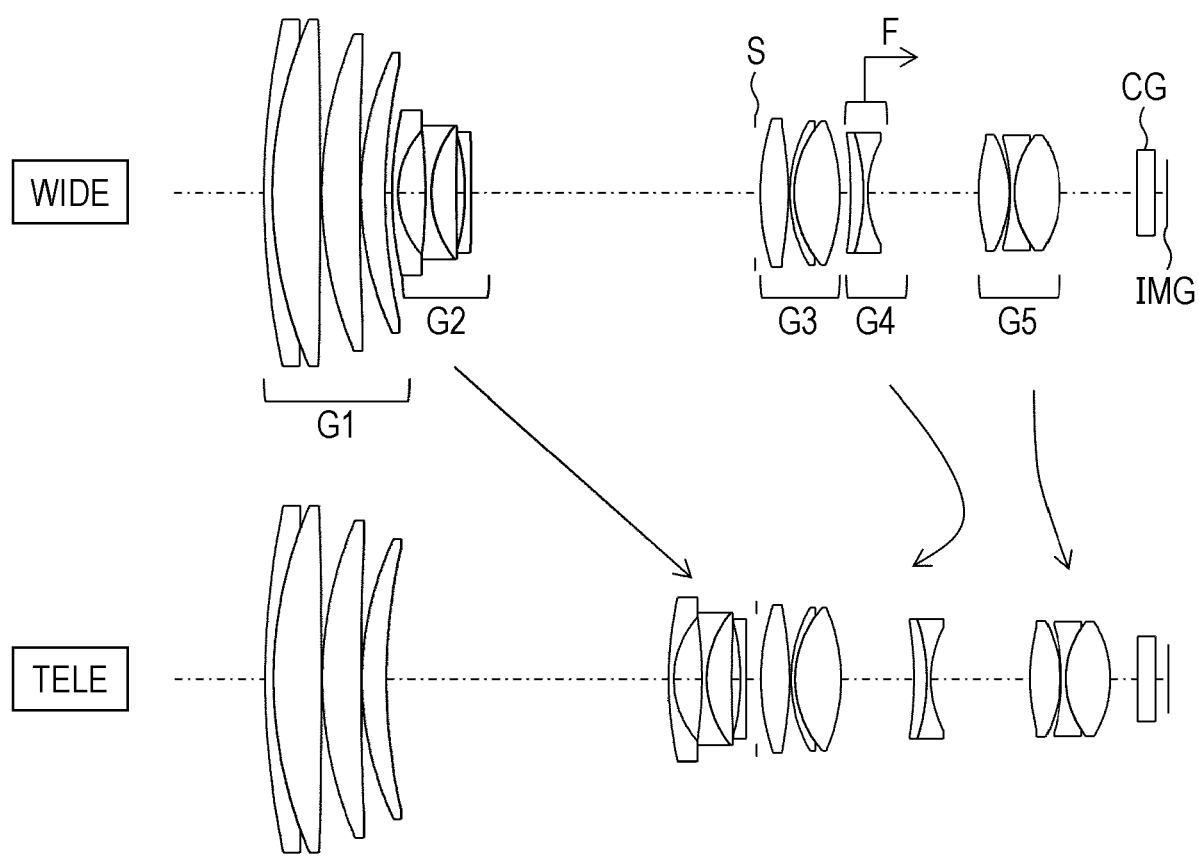
FIG. 1 is a diagram schematically showing an optical configuration of a zoom lens of Example 1 at infinity focusing at a wide-angle end and a telephoto end.

Hereinafter, implementation forms of a zoom lens and an imaging apparatus according to embodiments of the present invention will be described.

More specifically, the present embodiment is a zoom lens suitable for an imaging optical system of a digital input and output apparatus such as a mirrorless camera using a solid-state image sensor, a security camera, a digital still camera, and a medical camera. However, a zoom lens and an imaging apparatus to be described below are aspects of the zoom lens and the imaging apparatus according to the present invention, and the zoom lens and the imaging apparatus according to the present invention are not limited to the following aspects.

1. Zoom Lens 1-1. Optical Configuration

The zoom lens according to the embodiment of the present invention includes a first lens group having a positive refractive power, a second lens group having a negative refractive power, and a rear group having a positive refractive power in order from an object side. The rear group includes at least a third lens group, a fourth lens group, and a fifth lens group in order from the object side. Any one lens group of the third lens group, the fourth lens group, or the fifth lens group is a focus group. The zoom lens performs a variable magnification operation by changing a distance between the lens groups adjacent to each other. The zoom lens has a high magnification, can shorten a shortest imaging distance, and has high optical performance by appropriately arranging the lenses and powers of an optical system.

In the present specification, the "shortening the shortest imaging distance" means shortening an imageable distance to an object from a lens surface of a lens arranged closest to the object side in imaging at a close distance. The "shortest imaging distance" can also be referred to as a shortest focusing distance.

In the present specification, the "lens group" means a set of one or more lenses linked in the variable magnification operation. The lens group may include one lens, or may include a plurality of lenses. For example, the lens group may include a doublet lens in which a plurality of single lenses is integrated with no air space, or may include a compound lens in which one single lens and a resin are integrated with no air space. The lens in the lens group moves while maintaining a relative positional relationship in the variable magnification operation. The variable magnification operation is performed by changing the distance between the lens groups, and the distance between the lenses belonging to the same lens group is not changed in the variable magnification operation.

In the present specification, the "lens" may be not only one single lens but also the doublet lens or the compound lens. For example, the doublet lens in which two single lenses are cemented is described as one lens. The compound lens in which one single lens and the resin are combined will be described as one lens.

(1) First Lens Group

The first lens group is the lens group arranged closest to the object side in the zoom lens, and has the positive refractive power. The first lens group may have the positive refractive power as a whole, and may have at least one lens having a positive refractive power. The configuration of the lens in the first lens group can be appropriately determined within a range having the positive refractive power as a whole.

(2) Second Lens Group

The second lens group is the lens group arranged on an image side of the first lens group, and has the negative refractive power. The second lens group may have the negative refractive power as a whole, and may have at least one lens having a negative refractive power. The configuration of the lens in the second lens group can be appropriately determined within a range having the negative refractive power as a whole.

(3) Rear Group

The rear group is a set of lens groups arranged on an image side of the second lens group, and has a positive refractive power in the entire rear group. The rear group includes at least a third lens group, a fourth lens group, and a fifth lens group in order from the object side. The third lens group and the fourth lens group are arranged adjacent to each other, and the fourth lens group and the fifth lens group are arranged adjacent to each other. The rear group may further include one or more lens groups on an image side of the fifth lens group. For example, in the rear group, a sixth lens group may be arranged on the image side of the fifth lens group, the sixth lens group and a seventh lens group may be arranged on the image side of the fifth lens group in order from the object side.

The rear group may have the positive refractive power as a whole, and may have at least one lens group having a positive refractive power. The rear group may include only one or more lens groups having a positive refractive power. The rear group may include a lens group having a negative refractive power as long as the rear group has the positive refractive power as a whole, and it is preferable that the rear group includes at least one lens group having a positive refractive power and at least one lens group having a negative refractive power.

It is preferable that the variable magnification of the zoom lens having the high magnification is performed by mainly moving the second lens group having a high refractive power. Thus, it is preferable that the third lens group having a positive refractive power is arranged on the image side of the second lens group from the viewpoint of appropriately correcting an aberration fluctuation caused by the variable magnification of the second lens group, particularly a spherical aberration fluctuation. When the third lens group having a negative refractive power is arranged on the image side of the second lens group, it may not be possible to appropriately correct the aberration fluctuation caused by the variable magnification of the second lens group. Thus, since it is preferable to further arrange a lens group having a positive refractive power closer to the image side than the third lens group having the negative refractive power, it may be difficult to shorten a total length of the zoom lens. Accordingly, it is preferable that the third lens group has the positive refractive power from the viewpoint of realizing a high-magnification zoom lens.

From the viewpoint of canceling out the aberration occurring in each lens group, it is preferable that the lens group having the positive refractive power and the lens group having the negative refractive power are alternately arranged in the rear group. Thus, as described above, since it is preferable that the third lens group has the positive refractive power, the fourth lens group has a negative refractive power and the fifth lens group has a positive refractive power.

(4) Focus Group

The zoom lens has a focus group. The focus group performs focusing by moving on an optical axis of the zoom lens. The focusing may be performed by using the focus group in the zoom lens. At this time, the focus group may be moved in a direction of the optical axis. It is preferable that the focus group is any one of the third lens group, the fourth lens group, or the fifth lens group and is any one of the fourth lens group and the fifth lens group from the viewpoint of suppressing the aberration fluctuation caused by the focusing. It is preferable that the focus group have the negative refractive power and has a U-turn locus in which movement from a wide-angle end to a telephoto end is convex toward the image side from the viewpoint of reducing a maximum amount of movement of the lens group which occupies most of a distance on the optical axis and has the positive refractive power and realizing a compact zoom lens with a high magnification.

The third lens group usually has a large effect on the spherical aberration, but does not have an effect on curvature of field so much. Thus, in a case where the third lens group is operated as the focus group, it is easy to focus on an axis, but a resolution around the axis tends to be insufficient. Meanwhile, the fourth lens group and the fifth lens group usually have effects on not only the spherical aberration but also the curvature of field to the same extent. Thus, it is preferable that any one lens group of the fourth lens group or the fifth lens group is the focus group from the viewpoint of realizing sufficient resolutions on the axis and around the axis.

(5) Stop

The zoom lens may have a stop. However, the stop mentioned herein means a stop that defines a diameter of a pencil of light of the zoom lens, that is, a stop that defines an F value of the zoom lens. The arrangement of the stop in the zoom lens is not limited.

(6) Lens Group Configuration

The zoom lens includes only the first lens group having the positive refractive power, the second lens group having the negative refractive power, and the rear group having the positive refractive power in order from the object side. The rear group includes at least a third lens group, a fourth lens group, and a fifth lens group in order from the object side. Other lens groups are not included between the first lens group and the second lens group, between the second lens group and the third lens group, between the third lens group and the fourth lens group, and between the fourth lens group and the fifth lens group, but optical elements and stops other than lenses such as filters are not excluded.

1-2. Operation (1) Operation at Variable Magnification

In the zoom lens, at least the air space between the lens groups is changed at the variable magnification from a wide-angle end to a telephoto end. At the variable magnification from the wide-angle end to the telephoto end, it is preferable that at least two lens groups of the rear group move on the optical axis at the variable magnification from the wide-angle end to the telephoto end from the viewpoint of reducing the amount of movement of the second lens group at the variable magnification and the viewpoint of reducing the aberration fluctuation caused by the variable magnification of the second lens group. It is suitable for realizing a compact zoom lens having a high magnification and high optical performance. In the rear group, it is preferable that at least one lens group of the at least two moving lens groups has a locus along which movement performs a U-turn at one point from the wide-angle end to the telephoto end from the viewpoint of effectively utilizing a limited space and realizing a high magnification of the zoom lens.

It is preferable that the moving lens group in the rear group includes at least one lens group having the positive refractive power and at least one lens group having the negative refractive power from the viewpoint of realizing high performance. Due to movement of a pair of the lens group having the positive refractive power and the lens group having the negative refractive power in the rear group, it is possible to cancel out the aberrations caused in these lens groups, and the spherical aberration and the curvature of field of the entire zoom lens are further suppressed. Thus, it is preferable that this pair is moved from the viewpoint of realizing high performance.

It is preferable that the third lens group is fixed at the variable magnification from the wide-angle end to the telephoto end from the viewpoint of shortening the shortest imaging distance and realizing the zoom lens having high optical performance by securing a moving region of the focus group. The third lens group usually has a large effect on the spherical aberration. It is advantageous to fix the third lens group from the viewpoint of easily adjusting optical characteristics within the third lens group. Thus, it is preferable that the third lens group is fixed from the viewpoint of realizing high performance, particularly high performance at the wide-angle end at which the F value is small. The fixing of the third lens group means that the third lens group does not substantially move at the variable magnification.

It is preferable that the air space between the first lens group and the second lens group is changed so as to increase at the variable magnification from the wide-angle end to the telephoto end from the viewpoint of realizing a high magnification. It is preferable that the air space between the second lens group and the third lens group is changed so as to decrease from the viewpoint of realizing a high magnification.

(2) Operation in Focusing

In the zoom lens, the focusing can be performed by the focus group described above. As described above, the focus group that moves in focusing from infinity to a nearby object is any one lens group of the third lens group, the fourth lens group, or the fifth lens group. A moving direction of the focus group in focusing is not limited.

1-3. Expression Representing Expressions of Zoom Lens

It is preferable that the zoom lens according to the present embodiment adopts the above-described configuration and satisfies at least one or more of the following expression.

$$0.3 \leq |f_f|/M < 0.8 \quad (1)$$

where

M is a square root of a product of $f_w$ and $f_t$, $f_f$ is a focal length of the focus group, $f_w$ is a focal length at the wide-angle end of the zoom lens at infinity focusing, and $f_t$ is a focal length at the telephoto end of the zoom lens at infinity focusing.

As described above, M is the square root of the product of the focal length at the wide-angle end of the zoom lens at infinity focusing and the focal length at the telephoto end of the zoom lens at infinity focusing. Specifically M is defined by the following expression.

$$M = \sqrt{f_w \times f_t} \quad [\text{Expression 1}]$$

Expression (1) is an expression for defining a power of the focus group. It is preferable that the zoom lens satisfies Expression (1) from the viewpoint of achieving the high magnification of the zoom lens and shortening, the imaging distance in the entire zoom region. In contrast, when the zoom lens falls below a lower limit of Expression (1), the refractive power of the focus group may become too high. Thus, it is advantageous to achieve the high magnification of the zoom lens. However, the aberration fluctuation for each focusing distance increases, and it may be difficult to maintain the optical performance even in imaging at the shortest imaging distance. When the zoom lens exceeds an upper limit of Expression (1), the refractive power of the focus group may become too low. Thus, it is easy to suppress the aberration fluctuation for each focusing distance. However, the amount of movement for focusing in the entire zoom region becomes large, and it may be difficult to realize the high magnification over a desired total length of the zoom lens.

From the viewpoint of maintaining the optical performance even in imaging at the shortest imaging distance, $|f_f|/M$ is more preferably 0.35 or more, and further preferably 0.45 or more. From the viewpoint of realizing the high magnification of the zoom lens, $|f_f|/M$ is more preferably 0.7 or less, and further preferably 0.6 or less.

It is preferable that the zoom lens according to the present embodiment satisfies the following expression.

$$1.5 \leq \beta_{FW}/\beta_{FT} < 7.0 \quad (2)$$

where $\beta_{FW}$ is a lateral magnification at the wide-angle end in the focus group, and $\beta_{FT}$ is a lateral magnification at the telephoto end in the focus group.

Expression (2) is an expression for defining the lateral magnification of the focus group. It is preferable that the zoom lens satisfies Expression (2) from the viewpoint of appropriately correcting the aberration caused by the high magnification of the zoom lens. In contrast, when the zoom lens falls below a lower limit of Expression (2), it is easy to correct the aberration at focusing in the entire zoom region, but a magnification increase ratio using the focus group may become too low. Thus, it may be difficult to realize the high magnification of the zoom lens. When the zoom lens exceeds as upper limit of Expression (2), it is advantageous to realize the high magnification of the zoom lens, but it may be difficult to correct the aberration in the focus group. Thus, it may be difficult to appropriately correct the aberration at focusing in the entire zoom region.

From the viewpoint of realizing the high magnification of the zoom lens, $\beta_{FW}/\beta_{FT}$ is more preferably 1.8 or more, and further preferably 2.0 or more. From the viewpoint of appropriately correcting the aberration at focusing in the entire zoom region, $\beta_{FW}/\beta_{FT}$ is more preferably 6.0 or less, and further preferably 5.0 or less.

It is preferable that the zoom lens according to the present embodiment satisfies the following expression.

$$5.0 \leq \beta_{2T}/\beta_{2W} \leq 40.0 \quad (3)$$

where $\beta_{2T}$ is a lateral magnification at the telephoto end of the second lens group, and $\beta_{2W}$ is lateral magnification at the wide-angle end of the second lens group.

Expression (3) is an expression for defining a variable magnification ratio using the second lens group. It is preferable that the zoom lens satisfies Expression (3) from the viewpoint of balancing a variable magnification ratio of the second lens group to another lens group, realizing the high magnification of the zoom lens, and appropriately correcting the aberration. In contrast, when the zoom lens falls below a lower limit of Expression (3), the variable magnification ratio obtained by moving the second lens group may become too low. Thus, the amount of movement of the second lens group increases, and thus, it may be difficult to realize the high magnification in the desired total length of the zoom lens. When the zoom lens exceeds an upper of Expression (3), the refractive power of the second lens group is strengthened, and when the amount of movement of the second lens group increases, it is easy to achieve the high magnification of the zoom lens, but the aberration fluctuation at the variable magnification may become too large. Thus, it may be difficult to obtain high optical performance over the entire zoom range.

From the viewpoint of appropriately correcting the aberration, $\beta_{2T}/\beta_{2W}$ is more preferably 7.0 or more, and further preferably 9.0 or more. From the viewpoint of realizing the high magnification of the zoom lens, $\beta_{2T}/\beta_{2W}$ is more preferably 30.0 or less, and further preferably 20.0 or less.

When the third lens group has the positive refractive power, it is preferable that the zoom lens according to the present embodiment satisfies the following expression.

$$5.0 \leq f_t/f_3 \leq 15.0 \quad (4)$$

where $f_3$ is a focal length of the third lens group, and $f_t$ is a focal length at the telephoto end of the zoom lens at infinity focusing.

Expression is an expression for defining a ratio between the focal length at the telephoto end and the focal length of the third lens group at infinity focusing of the zoom lens. It is preferable that the zoom lens satisfies Expression (4) from the viewpoint of appropriately correcting the aberration at the telephoto end. In contrast, when the zoom lens falls below a lower limit of Expression (4), it is easy to correct the aberration of the third lens group, but the refractive power of the third lens group may become too low. Thus, it may be difficult to realize the high magnification of the zoom lens in the desired total length of the zoom lens. When the zoom lens exceeds the upper limit of Expression (4), the refractive power of the third lens group may become too high. Thus, it may be difficult to appropriately correct the aberration in the third lens group.

From the viewpoint of realizing the high magnification of the zoom lens, $f_t/f_3$ is more preferably 6.0 or more, and further preferably 7.0 or more. From the viewpoint of appropriately correcting the aberration in the third lens group, $f_t/f_3$ is more preferably 13.0 or less, and further preferably 11.0 or less.

It is preferable that the zoom lens according to the present embodiment satisfies the following expression.

$$3.0 \le |f_1/f_2| \le 10.0 \qquad (5)$$

where $f_1$ is a focal length of the first lens group, and $f_2$ is a focal length of the second lens group.

Expression (5) is an expression for defining a ratio between the focal length of the first lens group and the focal length of the second lens group. It is preferable that the zoom lens satisfies Expression (5) from the viewpoint of appropriately correcting the aberration at the telephoto end while achieving the high magnification of the zoom lens. In contrast, when the zoom lens falls below a lower limit of Expression (5), the aberration fluctuation caused by the variable magnification of the second lens group becomes small, but it may be difficult to appropriately correct the aberration at the telephoto end. When the zoom lens exceeds an upper limit of Expression (5), it may be easy to correct the aberration at the telephoto end while achieving the high magnification of the zoom lens, but the aberration fluctuation caused by the variable magnification of the second lens group becomes too large. Thus, it may be difficult to appropriately correct the aberration in the entire zoom region.

From the viewpoint of appropriately correcting the aberration at the telephoto end, $|f_1/f_2|$ is more preferably 4.0 or more, and further preferably 5.0 or more. From the viewpoint of appropriately correcting the aberration in the entire zoom region, $|f_1/f_2|$ is more preferably 9.0 or less, and further preferably 8.0 or less.

It is preferable that the zoom lens according to the present embodiment satisfies the following expression.

$$-0.4 \le \beta_{2W} \le -0.1 \qquad (6)$$

where $\beta_{2W}$ is a lateral magnification at the wide-angle end of the second lens group.

Expression (6) is an expression for defining the lateral magnification at the wide-angle end of the second lens group. It is preferable that the zoom lens satisfies Expression (6) from the viewpoint of appropriately correcting the aberration at the wide-angle end. In contrast, when the zoom lens falls below a lower limit of Expression (6), it may be easy to correct the aberration at the wide-angle end, but it may be difficult to widen the focal length at the wide-angle end. When the zoom lens exceeds an upper limit of Expression (6), it may be easy to widen the focal length at the wide-angle end, but it may be difficult to appropriately correct the aberration at the wide-angle end.

From the viewpoint of widening the focal length at the wide-angle end, $\beta_{2W}$ is more preferably −0.35 or more, and further preferably −0.30 or more. From the viewpoint of appropriately correcting the aberration at the wide-angle end, $\beta_{2W}$ is more preferably −0.16 or less, and further preferably −0.18 or less.

It is preferable that the zoom lens according to the present embodiment satisfies the following expression.

$$3.0 \le D_{2rw}/f_w \le 9.0 \qquad (7)$$

where $D_{2rw}$ is a distance on the optical axis between the lens surface of the second lens group closest to the image side at the wide-angle end of the zoom lens at infinity focusing and the lens surface of the third lens group closest to the object side, and $f_w$ is a focal length at the wide-angle end of the zoom lens at infinity focusing.

Expression (7) is an expression for defining a ratio of the focal length at the wide-angle end of the zoom lens at infinity focusing between the distance on the optical axis between the lens surface of the second lens group closest to the image side at the wide-angle end of the zoom lens at infinity focusing and the lens surface of the third lens group closest to the object side. It is preferable that the zoom lens satisfies Expression (7) from the viewpoint of further widening the focal length at the wide-angle end while achieving the miniaturization of the zoom lens. In contrast, when the zoom lens falls below a lower limit of Expression (7), it may be easy to achieve the miniaturization of the zoom lens, but it may be difficult to widen the focal length at the wide-angle end. When the zoom lens exceeds an upper limit of Expression (7), it may be easy to widen the focal length at the wide-angle end, but it may be difficult to achieve the miniaturization of the zoom lens.

From the viewpoint of widening the focal length at the wide-angle end, $D_{2rw}/f_w$ is more preferably 4.0 or more, and further preferably 5.0 or more. From the viewpoint of realizing the miniaturization of the zoom lens, $D_{2rw}/f_w$ is more preferably 8.0 or less, and further preferably 7.5 or less.

It is preferable that the zoom lens according to the present embodiment satisfies the following expression.

$$2.0 \le |m_2/f_2| \le 6.0 \qquad (8)$$

where $m_2$ is the amount of movement at the variable magnification from the wide-angle end to the telephoto end of the second lens group, and $f_2$ is a focal length of the second lens group.

Expression (8) is an expression for defining a ratio of the amount of movement of the second lens group at the variable magnification from the wide-angle end to the telephoto end and the focal length of the second lens group. It is preferable that the zoom lens satisfies Expression (8) from the viewpoint of appropriately correcting the aberration while achieving miniaturization of the zoom lens. In contrast, when the zoom lens falls below a lower of Expression (8), it may be easy to achieve the miniaturization of the zoom lens, but it may be difficult to appropriately correct the aberration. When the zoom lens exceeds an upper limit of Expression (8), it may be easy to correct the aberration in the entire zoom region, but the amount of movement caused by the variable magnification of the second lens group may become too large. Thus, it may be difficult to achieve the miniaturization of the zoom lens.

From the viewpoint of appropriately correcting the aberration, $|m_2/f_2|$ is more preferably 2.5 or more, and further preferably 3.0 or more. From the viewpoint of realizing the miniaturization of the zoom lens, $|m_2/f_2|$ is more preferably 5.5 or less, and further preferably 5.0 or less.

It is preferable that the zoom lens according to the present embodiment satisfies the following expression.

$$0.0<|f_p/f_n|<1.5 \qquad (9)$$

where $f_p$ is a focal length of the lens group having the highest positive refractive power among the moving lens groups in the rear group, and $f_n$ is a focal length of the lens group having the highest negative refractive power among the moving lens groups in the rear group.

Expression (9) is an expression for defining a ratio of the focal length of the lens group having the highest positive refractive power among the moving lens groups in the rear group and the focal length of the lens group having the highest negative refractive power among the moving lens groups in the rear group. It preferable that the zoom lens satisfies Expression (9) from the viewpoint of appropriately correcting the aberration at the wide-angle end. In contrast, when the zoom lens falls below a lower limit of Expression (9), it may be easy to realize the miniaturization of the zoom lens for reducing a moving range of the lens group having the positive refractive power a long distance on the optical axis, but it may be difficult to appropriately correct the spherical aberration at the wide-angle end. When the zoom lens exceeds an upper limit value of Expression (9), it becomes easy to correct the aberration at the wide-angle end, but the moving range of the lens group having the positive refractive power may become too large. Thus, it may be difficult to achieve the miniaturization of the zoom lens.

From the viewpoint of appropriately correcting the spherical aberration at the wide-angle end, $|f_p/f_n|$ is more preferably 0.4 or more, and further preferably 0.6 or more. From the viewpoint of realizing the miniaturization of the zoom lens, $|f_p/f_n|$ is more preferably 1.4 or less, and further preferably 1.3 or less.

It is preferable that the zoom lens according to the present embodiment satisfies the following expression.

$$-2.0<(R_{b1}-R_{b2})/(R_{b1}+R_{b2})\leq 2.0 \qquad (10)$$

where $R_{b1}$ is a radius of curvature of a surface on the object side of the lens arranged closest to the image side, and $R_{b2}$ is a radius of curvature of a surface on the image side of the lens arranged closest to the image side.

Expression (10) is an expression for defining a shape of the lens arranged closest to the image side. It is preferable that the zoom lens satisfies Expression (10) from the viewpoint of appropriately correcting the aberration while reducing ghost. In contrast, when the zoom lens falls below a lower limit of Expression (10), it may be easy to correct the curvature of field especially at the wide-angle end, but it may be difficult to reduce the ghost. When the zoom lens exceeds an upper limit value of Expression (10), it is possible to reduce the ghost, but it may be difficult to appropriately correct the curvature of field especially at the wide-angle end.

From the viewpoint of reducing the ghost, $(R_{b1}-R_{b2})/(R_{b1}+R_{b2})$ is more preferably −1.8 or more, and further preferably −1.6 or more. From the viewpoint of appropriately correcting the curvature of field at the wide-angle end, $(R_{b1}-R_{b2})/(R_{b1}+R_{b2})$ is more preferably 1.8 or less, and further preferably 1.6 or less.

2. Imaging Apparatus

Next, the imaging apparatus according to the embodiment of the present invention will be described. The imaging apparatus includes the zoom lens according to the above-described embodiment and an image sensor provided on an image plane side of the zoom lens that converts an optical image formed by the zoom lens into an electrical signal.

Here, the image sensor is not limited, and solid-state image sensors such as a charge coupled device (CCD) sensor and a complementary metal oxide semiconductor (CMOS) sensor, silver film, and the like can be used. The imaging apparatus according to the present embodiment is suitable for an imaging apparatus using the above-mentioned sold-state image sensor such as a digital camera and a video camera. The imaging apparatus according to the present invention may be a lens-fixed imaging apparatus of which a lens is fixed to a housing, or may be a lens-interchangeable imaging apparatus such as a single lens reflex camera or a mirrorless camera. In particular, the zoom lens according to the present embodiment can secure a back focus suitable for an interchangeable lens system. Thus, it is suitable for an imaging apparatus such as a single lens reflex camera equipped with an optical viewfinder, a phase difference sensor, a reflex mirror for branching light to the optical viewfinder and the phase difference sensor, and the like.

Figure 21:
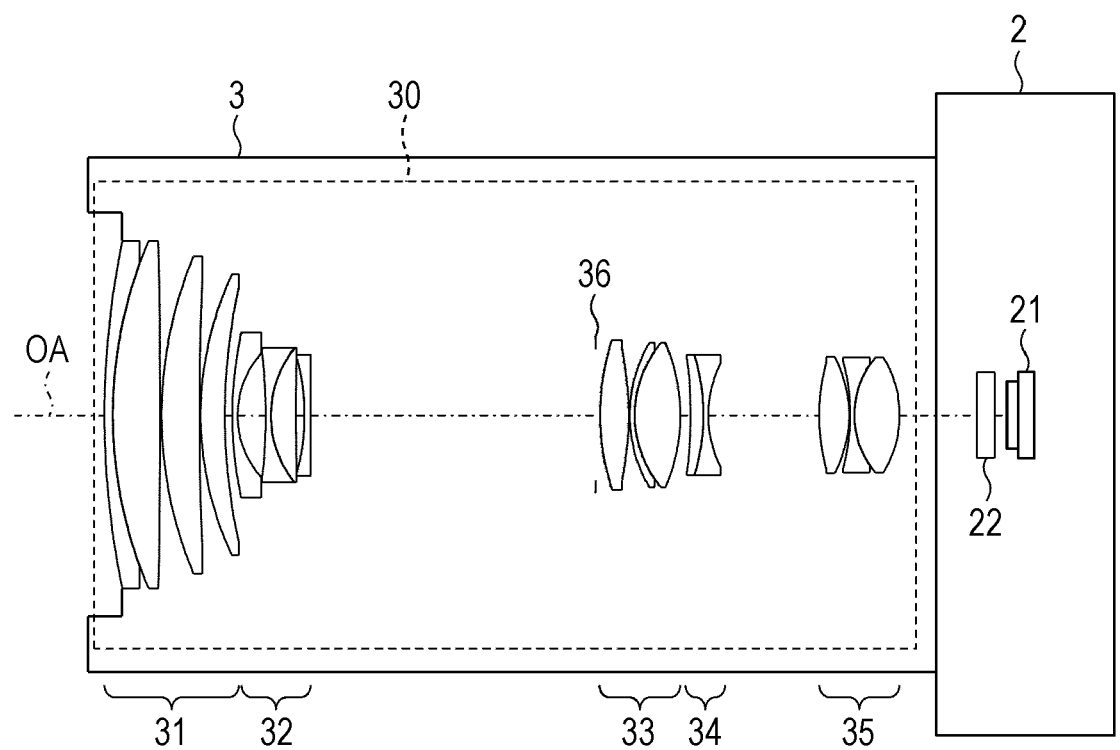
FIG. 21 is a diagram schematically showing an example of a configuration of an imaging apparatus according to an embodiment of the present invention.

FIG. 21 is a diagram schematically showing an example of a configuration of the imaging apparatus according to the present embodiment. As shown in FIG. 21, a mirrorless camera 1 includes a main body 2 and a lens barrel 3 that can be attached to and detached from the main body 2. The mirrorless camera 1 is an aspect of the imaging apparatus.

The lens barrel 3 has a zoom lens 30. The zoom lens 30 includes a first lens group 31, a second lens group 32, a third lens group 33, a fourth lens group 34, and a fifth lens group 35, and is configured to satisfy, for example, the above-mentioned Expressions (1) and (2). A stop 36 is arranged between the second lens group 32 and the third lens group 33.

The first lens group 31 has a positive refractive power, and the second lens group 32 has a negative refractive power. The third lens group 33 has a positive refractive power, the fourth lens group 34 has a negative refractive power, and the fifth lens group 35 has a positive refractive power. The third lens group 33, the fourth lens group 34, and the fifth lens group 35 correspond to the above-mentioned rear group.

The main body 2 includes a CCD sensor 21 as the image sensor and a cover glass 22. The CCD sensor 21 is arranged in the main body 2 at a position at which an optical axis OA of the zoom lens 30 in the lens barrel 3 mounted on the main body 2 is a central axis. The main body 2 may have a parallel flat plate having substantially no refractive power instead of the cover glass 22.

It is more preferable that the imaging apparatus according to the present embodiment includes an image processing unit that electrically processes captured image data acquired by the image sensor and changes a shape of a captured image, an image correction data retaining unit that retains image correction data and an image correction program used to process the captured image data in the image processing unit, and the like.

When the zoom lens is miniaturized, strain (distortion) of a captured image shape formed on an imaging plane tends to occur. At this time, it is preferable that the strain of the captured image shape. For example, strain correction data for correcting the strain of the captured image shape is retained in advance in the image correction data retaining unit, and the image processing unit performs the correction by using the strain correction data retained in the image correction data retaining unit. According to such an imaging apparatus, it is possible to further miniaturize the zoom lens, obtain a clear captured image, and miniaturize the entire imaging apparatus.

In the imaging apparatus according to the present embodiment, it is preferable that a magnification chromatic aberration correction data is retained in advance in the image correction data retaining unit. It is preferable that the image processing unit performs the magnification chromatic aberration correction of the captured image by using the magnification chromatic aberration correction data retained in the image correction data retaining unit. The image processing unit corrects the magnification chromatic aberration, that is, color distortion, and thus, the number of lenses constituting the optical system can be reduced. Thus, according to such an imaging apparatus, it is possible to further miniaturize the zoom lens, obtain the clear captured image, and miniaturize the entire imaging apparatus.

The present invention is not limited to the above-described embodiments, and various modifications can be made within the scope of the claims. Embodiments obtained by appropriately combining the technical means disclosed in the different embodiments are also included in the technical scope of the present invention.

EXAMPLES

An example of the present invention will be described below. In each of the following tables, a unit of a length is "mm", and a unit of an angle of view is "°". "E+a" indicates "×10$^a$".

Example 1

FIG. 1 is a diagram showing a cross section of a zoom lens of Example 1 at infinity focusing at the wide-angle end and the telephoto end. The zoom lens of Example 1 includes a first lens group G1 having a positive refractive power, a second lens group G2 having a negative refractive power, a third lens group G3 having a positive refractive power, a fourth lens group G4 having a negative refractive power, and a fifth lens group G5 having a positive refractive power in order from the object side. A stop S is arranged between the lens group G2 and the lens group G3. "IMG" represented in FIG. 1 is an image plane (imaging plane), and a cover glass CG is arranged between the fifth lens group G5 and the image plane IMG. "F" in FIG. 1 indicates a focus group, and the fourth lens group G4 is the focus group in the zoom lens of Example 1. The third lens group G3, the fourth lens group G4, and the fifth lens group G5 correspond to the above-mentioned rear group.

The zoom lens of Example 1 performs the variable magnification operation by changing the air space between the lens groups. In this figure, arrows represented below the lens groups at the wide-angle end indicate a locus of movement of the lens groups in moving from the wide-angle end to the telephoto end. At the variable magnification from the wide-angle end to an intermediate focal length state, the first lens group G1 and the third lens group G3 do not move, and the second lens group G2, the fourth lens group G4, and the fifth lens group G5 move to the image side. At the variable magnification from the intermediate focal length state to the telephoto end, the first lens group G1 and the third lens group G3 do not move, the second lens group G2 and the fifth lens group G5 move to the image side, and the fourth lens group G4 moves to the object side. The lens group having the highest positive refractive power in the moving lens group in the rear group is the fifth lens group G5, and the lens group having the highest negative refractive power in the moving lens group in the rear group is the fourth lens group G4.

Next, an example in which specific numerical values of the zoom lens are applied will be described. Table 1 is a table of surface data of the zoom lens of Example 1.

In the table of the surface data, "No." is an order of the lens surface counted from the object side, "r" is a radius of curvature of the lens surface, "d" is a distance on the optical axis of the lens surface, "Nd" is a refractive index for (wavelength λ=587.56 nm), "vd" is the Abbe number for a d line, and "H" is an effective radius. In surface numbers, the indication of "*" indicates that the lens surface is an aspheric surface, and the indication of "S" indicates the stop. The indications such as "D(7)" and "D(14)" in a field of "d" indicate that the distance on the optical axis of the lens surface is a variable distance changed at the variable magnification or focusing.

A radius of curvature "INF" means a plane. In Table 1, Nos. 1 to 7 are the surface numbers of the first lens group G1, Nos. 8 to 14 are the surface numbers of the second lens group G2, and No. 15 indicates the stop. Nos. 16 to 20 are the surface numbers of the third lens group G3, and Nos. 21 to 23 are the surface numbers of the fourth lens group G4. Nos. 24 to 28 are the surface numbers of the fifth lens group G5, No. 26 is the lens surface on the object side of the lens arranged closest to the image side, and No. 28 is the lens surface on the image side of the lens arranged closest to the image side. Nos. 29 and 30 indicate the cover glass CG, and No. 31 indicates the image plane.

TABLE 1

| No. | r | d | Nd | vd | H |
|---|---|---|---|---|---|
| 1 | 112.1976 | 1.1000 | 1.84666 | 23.78 | 21.00 |
| 2 | 57.5905 | 6.3000 | 1.49700 | 81.61 | 19.90 |
| 3 | −939.8475 | 0.1500 | | | 21.48 |
| 4 | 53.4899 | 5.0500 | 1.49700 | 81.61 | 19.56 |
| 5 | 402.8046 | 0.1500 | | | 18.07 |
| 6 | 43.5189 | 3.2000 | 1.69680 | 55.46 | 17.23 |
| 7 | 78.2228 | D(7) | | | 16.80 |
| 8 | 50.2170 | 0.7000 | 1.91082 | 35.25 | 9.90 |
| 9 | 12.1770 | 3.7117 | | | 8.08 |
| 10 | −62.2615 | 0.7000 | 1.90043 | 37.37 | 8.02 |
| 11 | 14.0000 | 3.3000 | 1.98612 | 16.48 | 7.48 |
| 12 | 208.9337 | 1.1316 | | | 7.25 |
| 13 * | −26.8364 | 0.8000 | 1.85370 | 40.60 | 7.23 |
| 14 * | −500.0000 | D(14) | | | 7.18 |
| 15 S | INF | 0.6000 | | | 8.58 |
| 16 * | 29.8008 | 3.8000 | 1.59201 | 67.02 | 8.90 |
| 17 * | −36.0015 | 0.1500 | | | 8.88 |
| 18 | 19.0908 | 0.6000 | 1.92286 | 18.90 | 8.63 |
| 19 | 14.4921 | 6.0000 | 1.43700 | 95.10 | 8.32 |
| 20 | −24.5409 | D(20) | | | 8.06 |

TABLE 1-continued

| No. | r | d | Nd | vd | H |
|---|---|---|---|---|---|
| 21 | −53.4424 | 1.7000 | 1.95906 | 17.47 | 7.19 |
| 22 | −25.6932 | 0.6000 | 1.69680 | 55.46 | 7.06 |
| 23 | 15.0753 | D(23) | | | 6.52 |
| 24 * | 25.7320 | 4.0000 | 1.59201 | 67.02 | 6.92 |
| 25 * | −13.5375 | 0.1000 | | | 6.95 |
| 26 | −28.1420 | 0.6000 | 1.83481 | 42.72 | 6.73 |
| 27 | 11.9183 | 5.9500 | 1.55032 | 75.50 | 6.66 |
| 28 | −14.2198 | D(28) | | | 6.88 |
| 29 | INF | 2.4000 | 1.51680 | 64.20 | 5.11 |
| 30 | INF | 1.6248 | | | 4.88 |
| 31 | INF | | | | |

Table 2 shows the specifications of the zoom lens of Example 1. In the specification table, numerical values at the wide-angle end, the intermediate focal length state, and the telephoto end are shown in order from a left side. In the specification table, "f" indicates the focal length of the zoom lens at infinity focusing, "FNO" indicates the F value, and "ω" indicates a half angle of view. In the specification table, "D(n)" (n is an integer) indicates the variable distance on the optical axis of the zoom lens at the variable magnification.

TABLE 2

| f | 6.7540 | 78.3064 | 155.8625 |
|---|---|---|---|
| FNO | 1.6473 | 4.3760 | 4.9900 |
| ω | 32.9390 | 3.2298 | 1.6576 |
| D(7) | 0.9550 | 32.2686 | 37.2483 |
| D(14) | 37.5933 | 6.2797 | 1.3000 |
| D(20) | 1.4290 | 13.7638 | 9.6363 |
| D(23) | 14.6550 | 5.7445 | 13.0704 |
| D(28) | 10.2223 | 6.7981 | 3.5999 |

Table 3 is a table showing aspheric coefficients of aspheric surfaces in the zoom lens of Example 1. The aspheric coefficient in the table is a value when each aspheric surface shape is defined by the following expression.

$$z = ch^2/[1+\{1-(1+K)c^2h^2\}^{1/2}] + A4h^4 + A6h^6 + A8h^8 + A10h^{10} + A12h^{12} + A14h^{14} + A16h^{16} + A18h^{18} + A20h^{20}$$ [Expression]

In the above-described expression, it is assumed that "z" is the amount of displacement of the aspheric surface in an optical axis direction from a reference surface perpendicular to the optical axis, "c" is a curvature (1/r), "h" is a height from the optical axis, and "K" is a conical coefficient, and "An" (n is an integer) is an n-order aspheric coefficient. The aspheric coefficient of the surface number not indicated is zero.

Table 4 shows focal lengths of the lens groups constituting the zoom lens of Example 1.

TABLE 4

| Lens group | Surface number | Focal length |
|---|---|---|
| G1 | 1-7 | 58.1095 |
| G2 | 8-14 | −8.69447 |
| G3 | 16-20 | 15.8525 |
| G4 | 21-23 | −18.3001 |
| G5 | 24-28 | 20.8268 |

Figure 2:
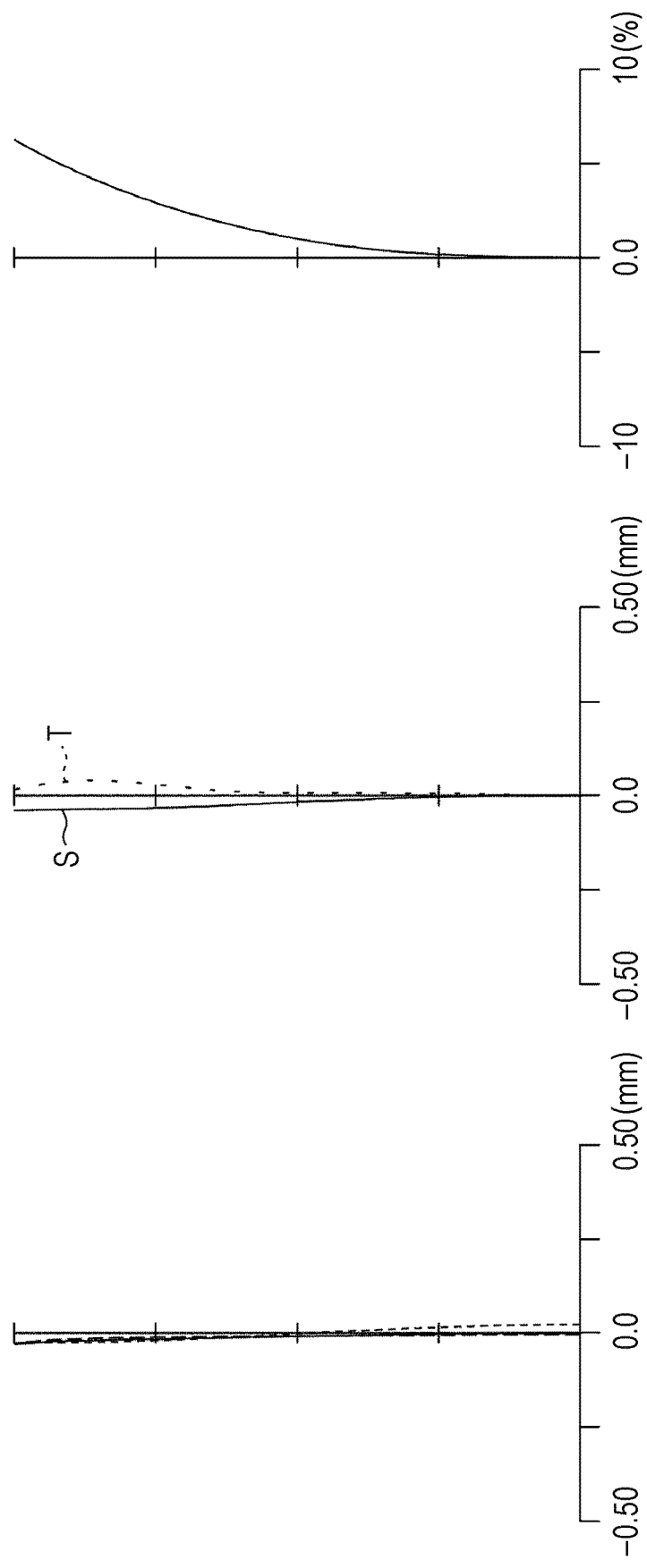
FIG. 2 is a diagram showing longitudinal aberrations of the zoom lens of Example 1 at infinity focusing at the wide-angle end.
Figure 3:
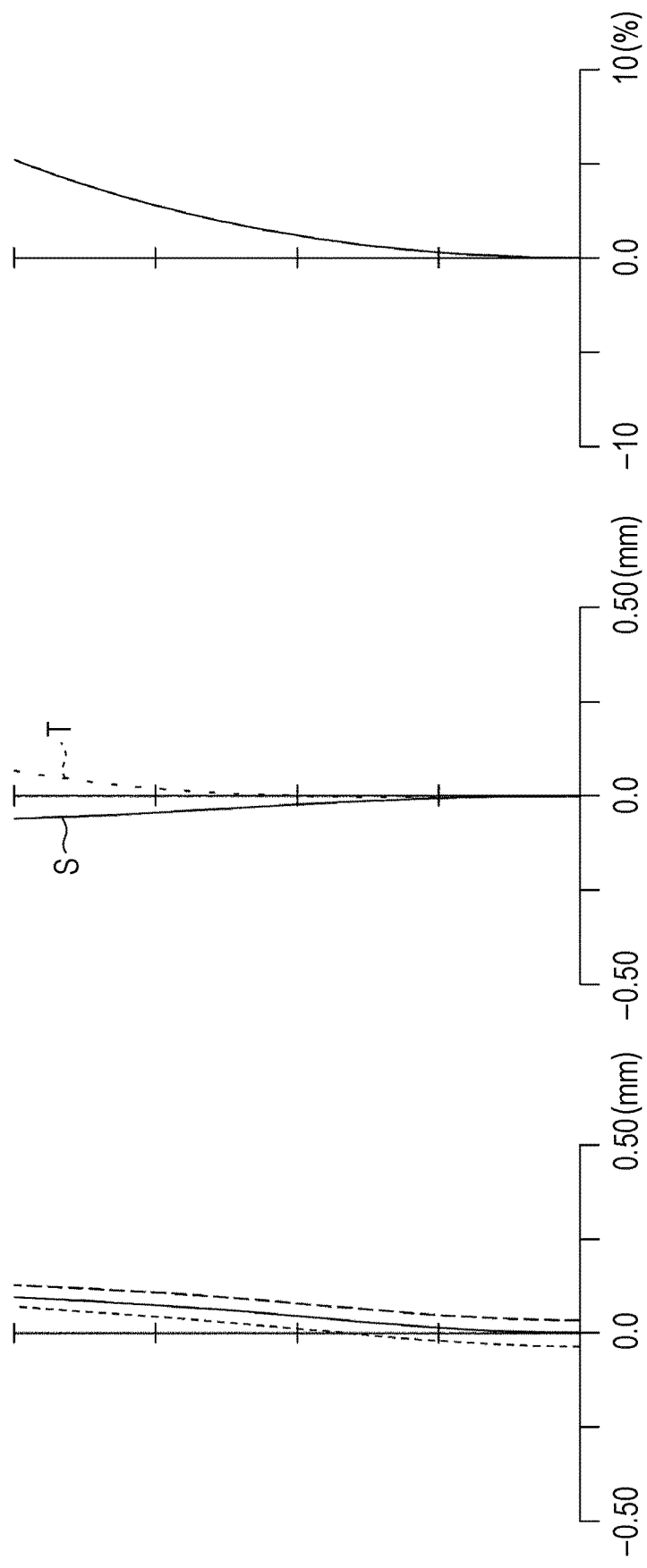
FIG. 3 is a diagram showing longitudinal aberrations of the zoom lens of Example 1 at infinity focusing in an intermediate focal length state.
Figure 4:
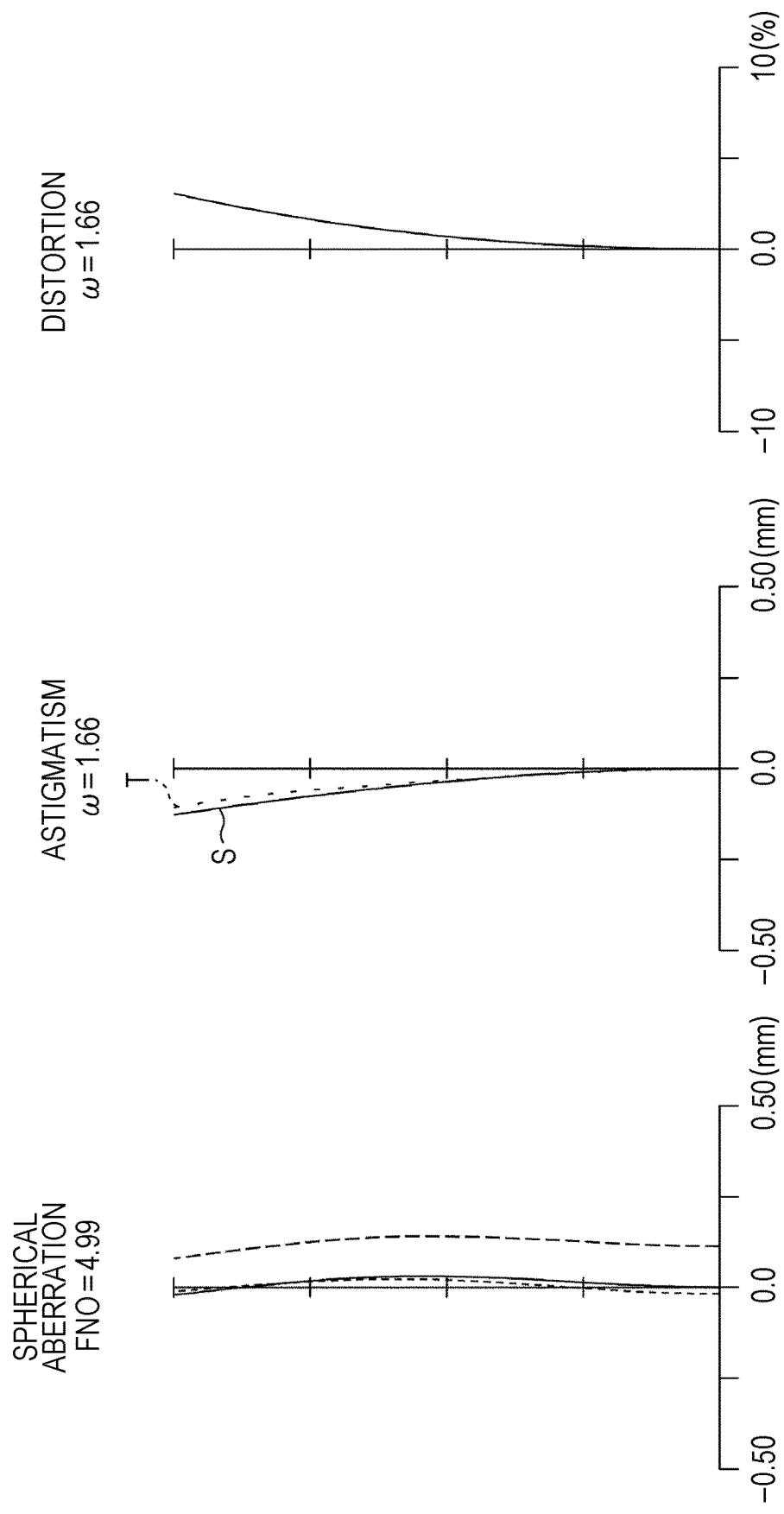
FIG. 4 is a diagram showing longitudinal aberrations of the zoom lens of Example 1 at infinity focusing at the telephoto end.

FIGS. 2, 3 and 4 are diagrams showing longitudinal aberrations at the wide-angle end, the intermediate focal length state, and the telephoto end the zoom lens of Example 1 at infinity focusing, respectively. Diagrams showing the longitudinal aberrations shown in each figure are spherical aberration (SA (mm)), astigmatism (AST mm)), and distortion (DIS (%)) in order from the left side when facing the diagram. The same applies to other examples.

In the diagrams showing the spherical aberrations, a vertical axis is the F value, and a horizontal axis is defocus. In the diagrams showing the spherical aberrations, the spherical aberrations at a solid line of a d line (d-line, wavelength λ=587.56 nm), a short dashed line of an F line (F-line, wavelength λ=486.13 nm), and a long dashed line of a C line (C-line, wavelength λ=656.28 nm) are shown.

In the diagrams showing the astigmatisms, a vertical axis is the half angle of view, and a horizontal axis is the defocus. In the diagrams showing the astigmatisms, a solid line shows a sagittal image plane (indicated by S in the diagram) with respect to the d line, and a broken line shows the astigmatism in a meridional plane (indicated by T in the figure) with respect to the d line.

In the diagrams showing the distortions, a vertical axis is the half angle of view, and a horizontal axis is %.

Example 2

Figure 5:
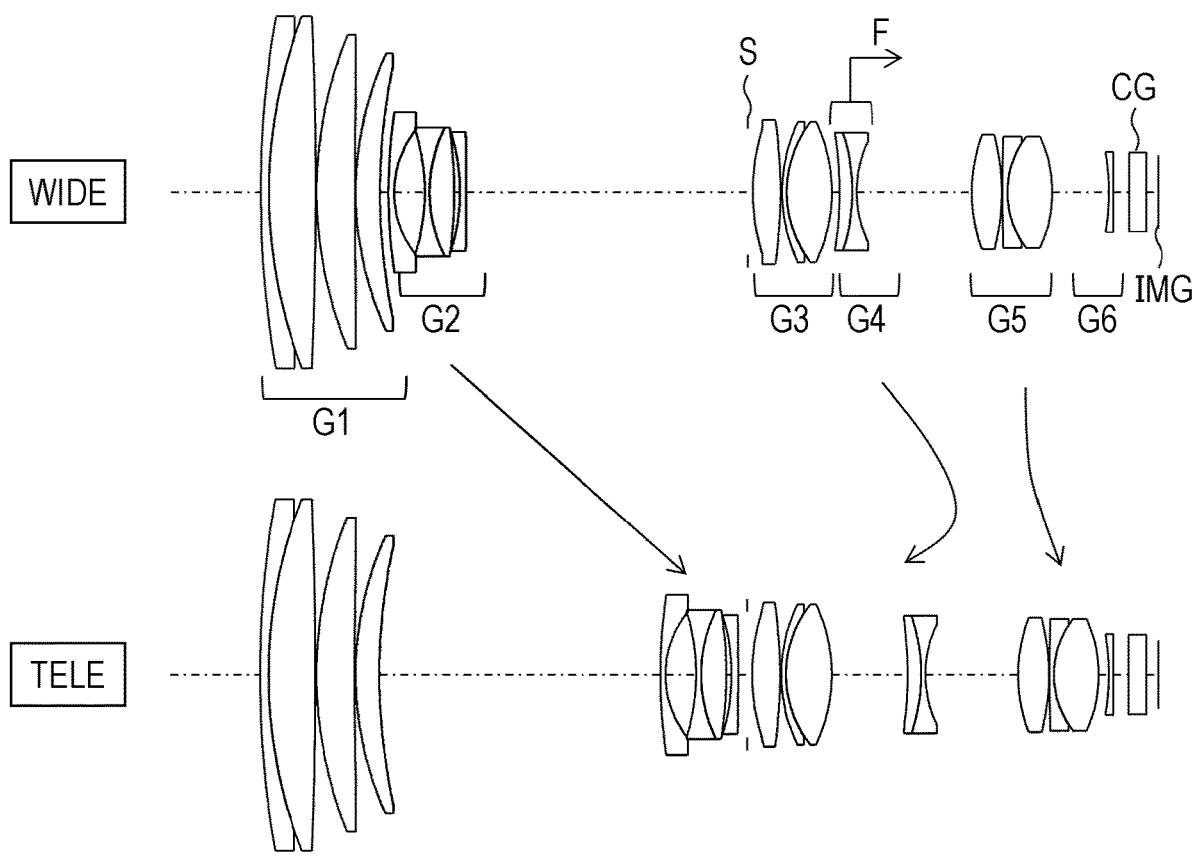
FIG. 5 is a diagram schematically showing an optical configuration of a zoom lens of Example 2 at infinity focusing at a wide-angle end and a telephoto end.
Figure 6:
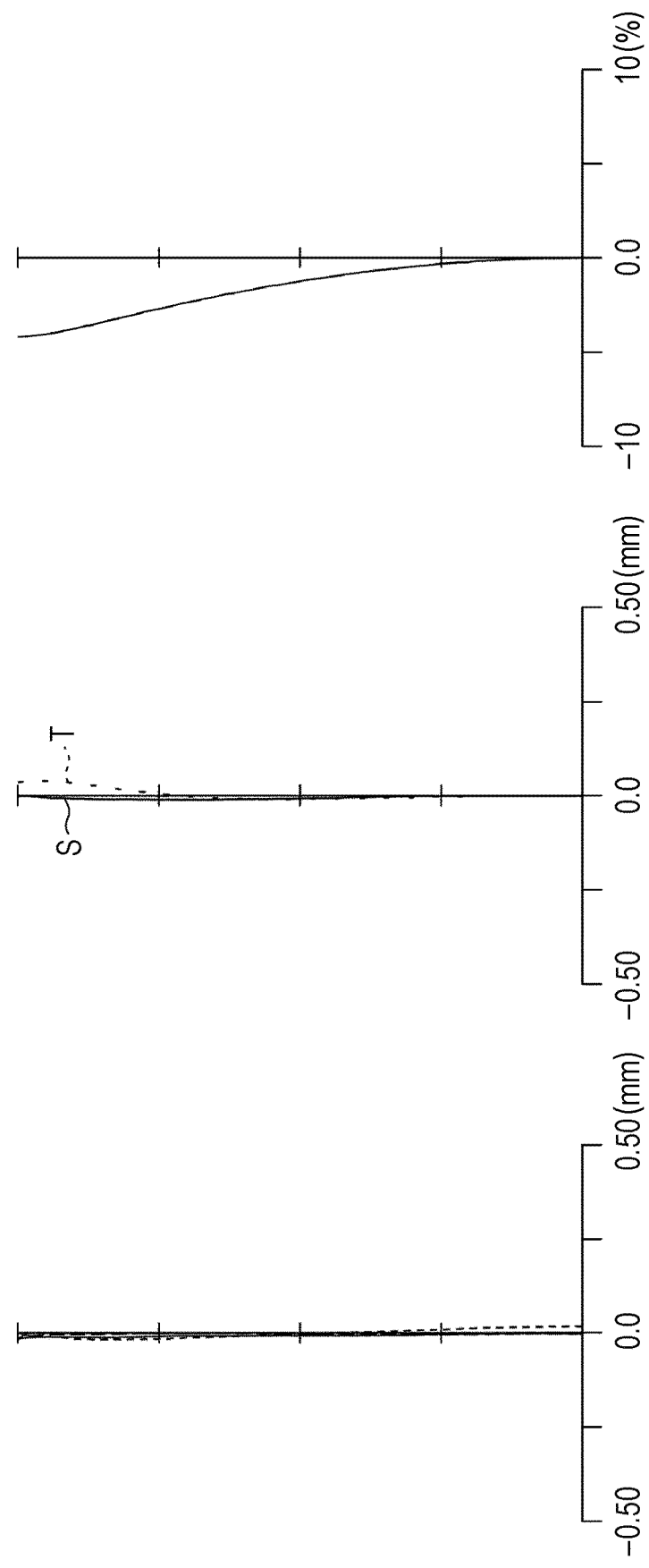
FIG. 6 is a diagram showing longitudinal aberrations of the zoom lens of Example 2 at infinity focusing at the wide-angle end.
Figure 7:
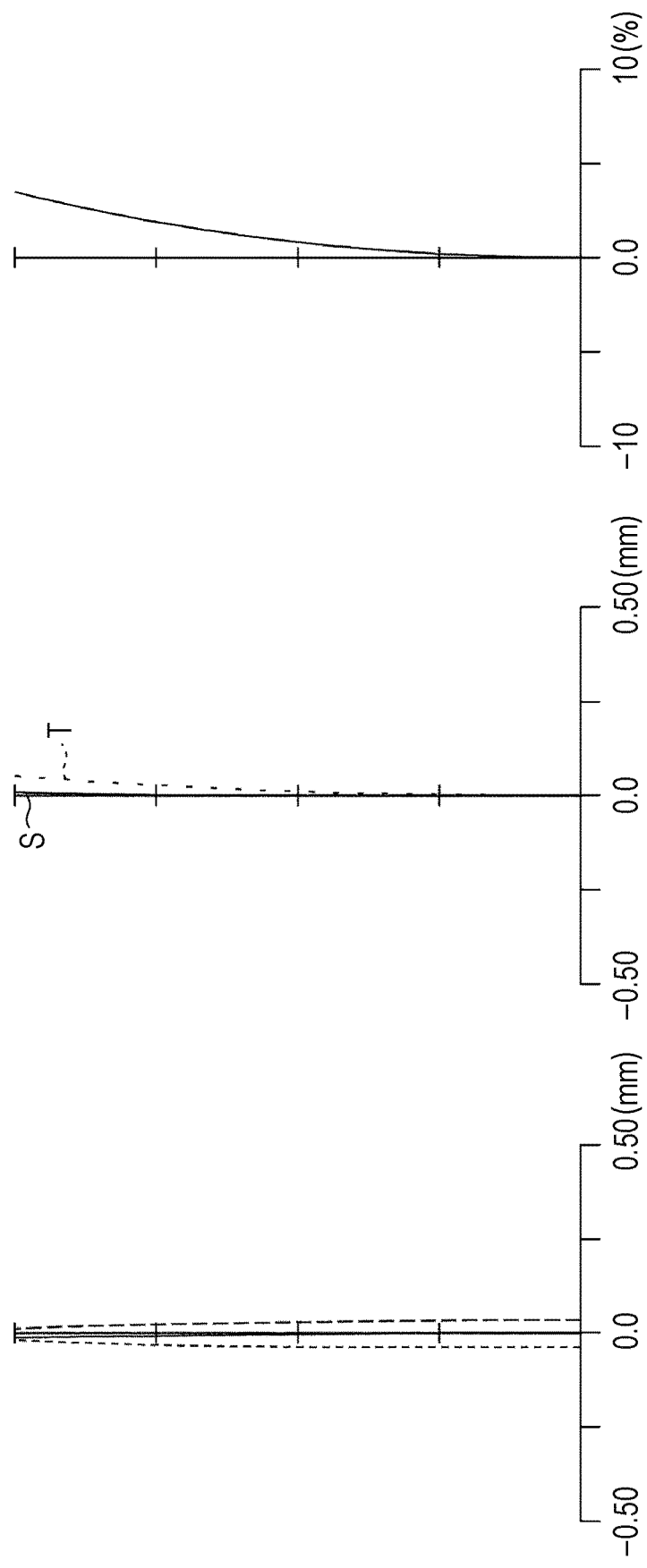
FIG. 7 is a diagram showing longitudinal aberrations of the zoom lens of Example 2 at infinity focusing in an intermediate focal length state.
Figure 8:
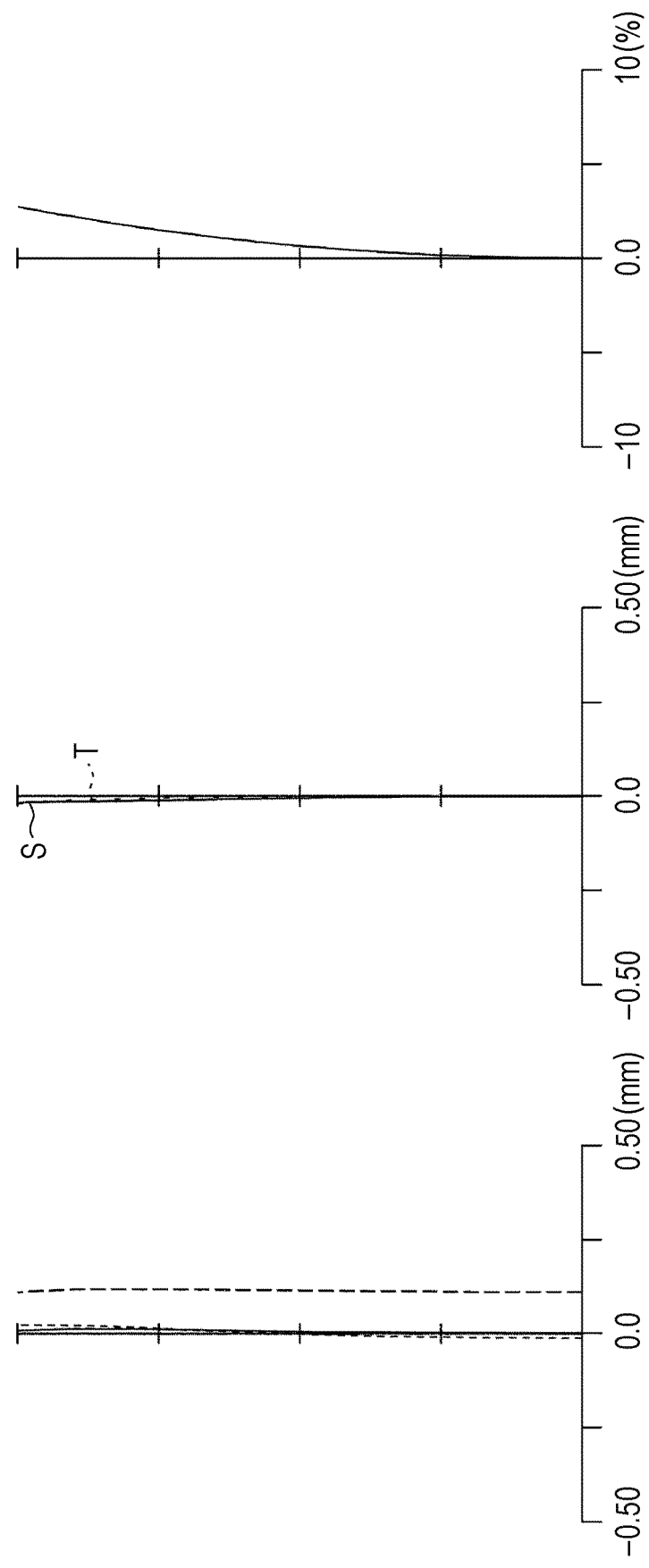
FIG. 8 is a diagram showing longitudinal aberrations of the zoom lens of Example 2 at infinity focusing at the telephoto end.

FIG. 5 is a diagram schematically showing an optical configuration of a zoom lens of Example 2 at infinity focusing at the wide-angle end and the telephoto end. FIGS. 6, 7, and 8 are diagrams showing longitudinal aberrations at the wide-angle end, the intermediate focal length state, and the telephoto end of the zoom lens of Example 2 at infinity focusing, respectively. The zoom lens of Example 2 includes, in order from the object side, a first lens group G1 having a positive refractive power, a second lens group G2 having a negative refractive power, a third lens group G3

TABLE 3

| No. | K | A4 | A6 | A8 | A10 |
|---|---|---|---|---|---|
| 13 | −6.82425E+00 | 6.71059E−05 | −1.28979E−06 | −2.21950E−08 | 3.79256E−10 |
| 14 | −10.00000E+00 | 9.90165E−05 | −1.85285E−06 | 1.80642E−10 | −2.47129E−11 |
| 16 | 7.23002E−02 | −1.00114E−05 | −1.73186E−07 | 2.06559E−09 | −2.15916E−12 |
| 17 | 2.86949E+00 | 4.23935E−05 | −1.39545E−07 | 2.20987E−09 | −1.60939E−12 |
| 24 | −1.53905E+00 | −6.74771E−06 | 2.25878E−07 | −2.25906E−09 | 7.72606E−11 |
| 25 | −1.45478E+00 | 9.15364E−05 | −2.36607E−07 | −1.01907E−08 | 2.15078E−10 |

| No. | A12 | A14 | A16 | A18 | A20 |
|---|---|---|---|---|---|
| 13 | −1.27271E−12 | 0.00000E+00 | 0.00000E+00 | 0.00000E+00 | 0.00000E+00 |
| 14 | 1.69396E−12 | 0.00000E+00 | 0.00000E+00 | 0.00000E+00 | 0.00000E+00 |
| 16 | 0.00000E+00 | 0.00000E+00 | 0.00000E+00 | 0.00000E+00 | 0.00000E+00 |
| 17 | 0.00000E+00 | 0.00000E+00 | 0.00000E+00 | 0.00000E+00 | 0.00000E+00 |
| 24 | −3.53885E−12 | 0.00000E+00 | 0.00000E+00 | 0.00000E+00 | 0.00000E+00 |
| 25 | −4.16134E−12 | 0.00000E+00 | 0.00000E+00 | 0.00000E+00 | 0.00000E+00 | having a positive refractive power, a fourth lens group G4 having a negative refractive power, a fifth lens group G5 having a positive refractive power, and a sixth lens group G6 having a negative refractive power. A stop S is arranged between the lens group G2 and the lens group G3. In the zoom lens of Example 2, the fourth lens group G4 is the focus group. The third lens group G3, the fourth lens group G4, the fifth lens group G5, and the sixth lens group G6 correspond to the above-mentioned rear group.

The zoom lens of Example 2 performs the variable magnification operation by changing the air space between the lens groups. At the variable magnification from the wide-angle end to the intermediate focal length state, the first lens group G1, the third lens group G3, and the sixth lens group G6 do not move, and the second lens group G2, the fourth lens group G4, and the fifth lens group G5 move to the image side. At the variable magnification from the intermediate focal length state to the telephoto end, the first lens group G1, the third lens group G3, and the sixth lens group G6 do not move, the second lens group G2 and the fifth lens group G5 move to the image side, and the fourth lens group G4 moves to the object side. The lens group having the highest positive refractive power in the moving lens group in the rear group is the fifth lens group G5, and the lens group having the highest negative refractive power in the moving lens group in the rear group is the fourth lens group G4.

Table 5 is a table of surface data of the zoom lens of Example 2. In Table 5, Nos. 1 to 7 are surface numbers of the first lens group G1, Nos. 8 to 14 are surface numbers of the second lens group G2, and No. 15 indicates the stop. Nos. 16 to 20 are surface numbers of the third lens group G3, Nos. 21 to 23 are surface numbers of the fourth lens group G4, and Nos. 24 to 28 are surface numbers of the fifth lens group G5. Nos. 29 and 30 are surface numbers of the sixth lens group G6, No. 29 is the lens surface on the object side of the lens arranged closest to the image side, and No. 30 is the lens surface on the image side of the lens arranged closest to the image side. Nos. 31 and 32 indicate the cover glass CG, and No. 33 indicates the image plane.

TABLE 5

| No. | r | d | Nd | vd | H |
|---|---|---|---|---|---|
| 1 | 137.1778 | 1.1000 | 1.84666 | 23.78 | 22.01 |
| 2 | 63.3444 | 6.3000 | 1.49700 | 81.61 | 20.80 |

TABLE 5-continued

| No. | r | d | Nd | vd | H |
|---|---|---|---|---|---|
| 3 | −545.3327 | 0.1500 | | | 21.48 |
| 4 | 55.7604 | 5.0500 | 1.49700 | 81.61 | 19.56 |
| 5 | 946.9574 | 0.1500 | | | 18.10 |
| 6 | 44.7580 | 3.2000 | 1.69680 | 55.46 | 17.23 |
| 7 | 83.8349 | D(7) | | | 16.82 |
| 8 | 76.4543 | 0.7000 | 1.91082 | 35.25 | 9.73 |
| 9 | 13.5628 | 4.0584 | | | 8.01 |
| 10 | −28.0000 | 0.7000 | 1.90043 | 37.37 | 7.82 |
| 11 | 19.8770 | 3.3000 | 1.98612 | 16.48 | 7.48 |
| 12 | −55.8236 | 0.7319 | | | 7.33 |
| 13 * | −24.5384 | 0.8000 | 1.85370 | 40.60 | 7.26 |
| 14 * | −337.3098 | D(14) | | | 7.18 |
| 15 S | INF | 0.6000 | | | 8.41 |
| 16 * | 25.7945 | 3.8000 | 1.59201 | 67.02 | 8.72 |
| 17 * | −47.3443 | 0.1500 | | | 8.72 |
| 18 | 21.5948 | 0.6000 | 1.92286 | 18.90 | 8.51 |
| 19 | 15.3800 | 6.0000 | 1.43700 | 95.10 | 8.21 |
| 20 | −21.7919 | D(20) | | | 7.95 |
| 21 | −50.6210 | 1.7000 | 1.95906 | 17.47 | 7.15 |
| 22 | −25.0246 | 0.6000 | 1.69680 | 55.46 | 7.01 |
| 23 | 15.8232 | D(23) | | | 6.47 |
| 24 * | 20.9644 | 4.0000 | 1.59201 | 67.02 | 6.92 |
| 25 * | −25.0363 | 0.1000 | | | 6.91 |
| 26 | 439.1565 | 0.6000 | 1.83481 | 42.72 | 6.78 |
| 27 | 12.2911 | 5.9500 | 1.55032 | 75.50 | 6.58 |
| 28 | −17.6631 | D(28) | | | 6.63 |
| 29 | −32.1711 | 0.6000 | 2.00069 | 25.46 | 4.90 |
| 30 | −30000.0000 | 2.0000 | | | 4.88 |
| 31 | INF | 2.4000 | 1.51680 | 64.20 | 4.79 |
| 32 | INF | 1.6256 | | | 4.72 |
| 33 | INF | | | | |

Table 6 shows the specifications the zoom lens of Example 2. Table 7 is a table showing aspheric coefficients of aspheric surfaces in the zoom lens of Example 2. Table 8 shows focal lengths of the lens groups constituting the zoom lens of Example 2.

TABLE 6

| f | 6.7582 | 78.7812 | 156.0507 |
|---|---|---|---|
| FNO | 1.6473 | 4.3760 | 4.9900 |
| ω | 35.6868 | 3.2654 | 1.6611 |
| D(7) | 1.1343 | 32.1670 | 37.3748 |
| D(14) | 37.5405 | 6.5078 | 1.3000 |
| D(20) | 1.0191 | 14.4315 | 10.2661 |
| D(23) | 15.3822 | 5.7863 | 12.3669 |
| D(28) | 7.5316 | 3.7152 | 1.3000 |

TABLE 7

| No. | K | A4 | A6 | A8 | A10 |
|---|---|---|---|---|---|
| 13 | −8.95414E+00 | 2.76740E−05 | −1.54642E−06 | −4.20318E−09 | 2.73149E−10 |
| 14 | 10.00000E+00 | 8.98462E−05 | −1.95127E−06 | 2.64909E−09 | 1.78506E−10 |
| 16 | −2.60816E−01 | −1.13471E−05 | −2.03570E−07 | 3.86231E−09 | −4.04436E−11 |
| 17 | 3.57107E+00 | 4.07381E−05 | −1.63027E−07 | 3.66926E−09 | −3.81222E−11 |
| 24 | −1.72992E+00 | 1.24755E−05 | 6.97558E−08 | −5.37426E−09 | 1.78788E−10 |
| 25 | −3.23130E+00 | 5.33863E−05 | −4.06009E−08 | −8.34748E−09 | 2.40330E−10 |

| No. | A12 | A14 | A16 | A18 | A20 |
|---|---|---|---|---|---|
| 13 | −1.67631E−12 | 0.00000E+00 | 0.00000E+00 | 0.00000E+00 | 0.00000E+00 |
| 14 | −1.06947E−12 | 0.00000E+00 | 0.00000E+00 | 0.00000E+00 | 0.00000E+00 |
| 16 | 0.00000E+00 | 0.00000E+00 | 0.00000E+00 | 0.00000E+00 | 0.00000E+00 |
| 17 | 0.00000E+00 | 0.00000E+00 | 0.00000E+00 | 0.00000E+00 | 0.00000E+00 |
| 24 | −1.91639E−12 | 0.00000e+00 | 0.00000E+00 | 0.00000E+00 | 0.00000E+00 |
| 25 | −2.42908E−12 | 0.00000E+00 | 0.00000E+00 | 0.00000E+00 | 0.00000E+00 |

TABLE 8

| Lens group | Surface number | Focal length |
|---|---|---|
| G1 | 1-7 | 57.9427 |
| G2 | 8-14 | -9.04449 |
| G3 | 16-20 | 16.5244 |
| G4 | 21-23 | -18.8028 |
| G5 | 24-28 | 18.0092 |
| G6 | 29-30 | -32.1836 |

Example 3

Figure 9:
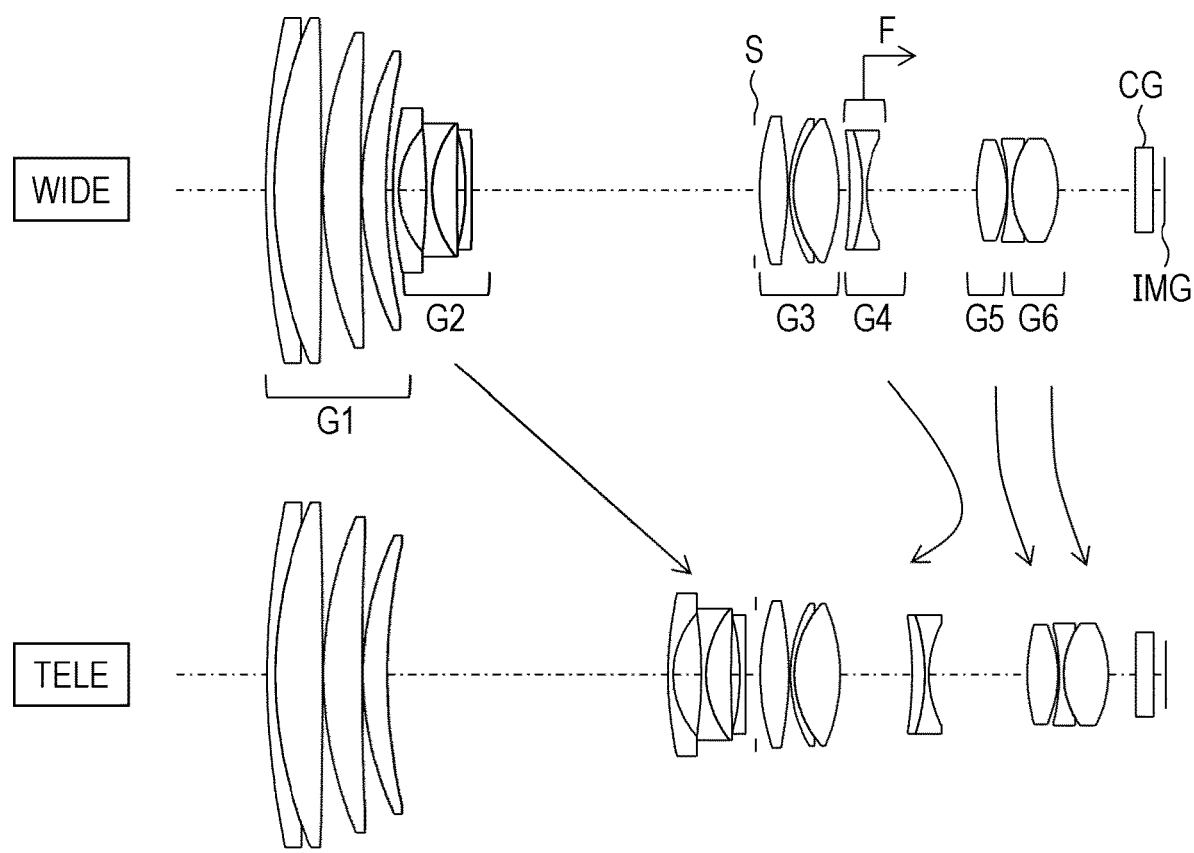
FIG. 9 is a diagram schematically showing an optical configuration of a zoom lens of Example 3 at infinity focusing at a wide-angle end and a telephoto end.
Figure 10:
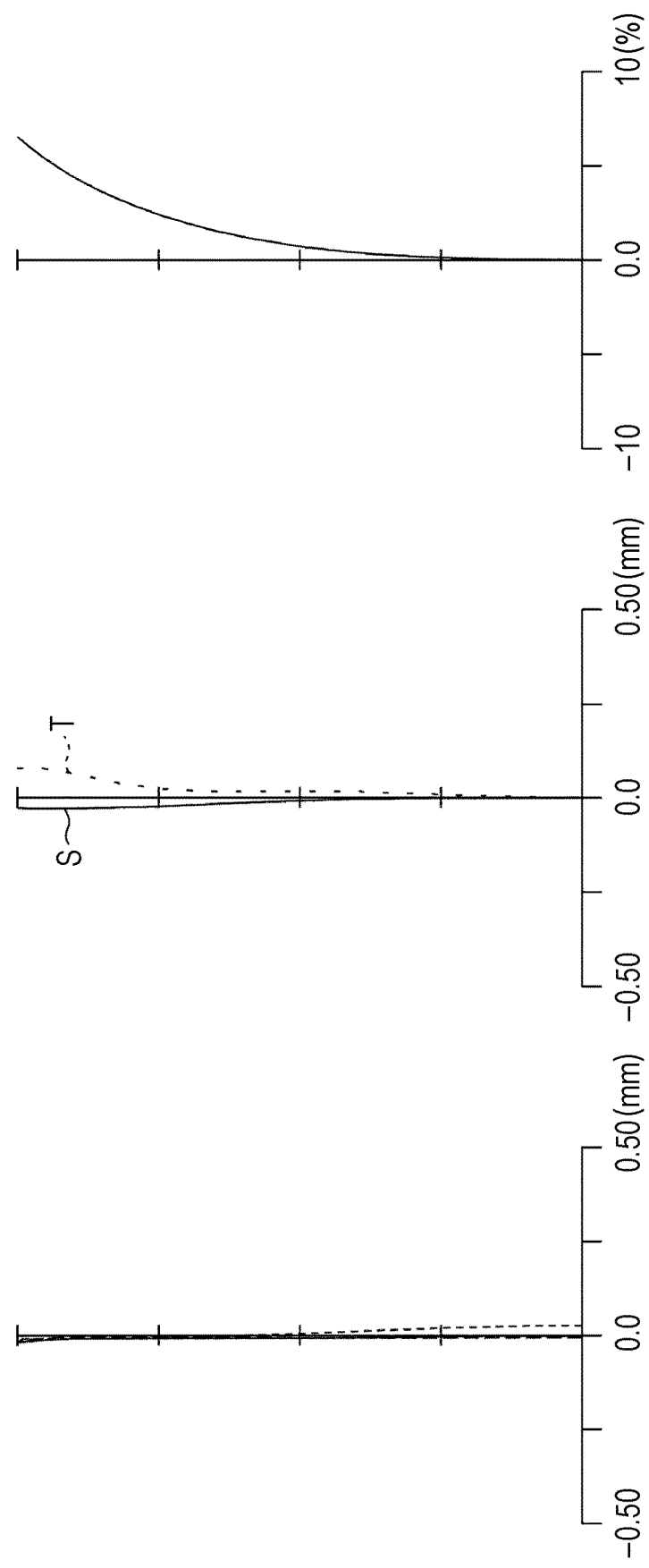
FIG. 10 is a diagram showing longitudinal aberrations of the zoom lens of Example 3 at infinity focusing at the wide-angle end.
Figure 11:
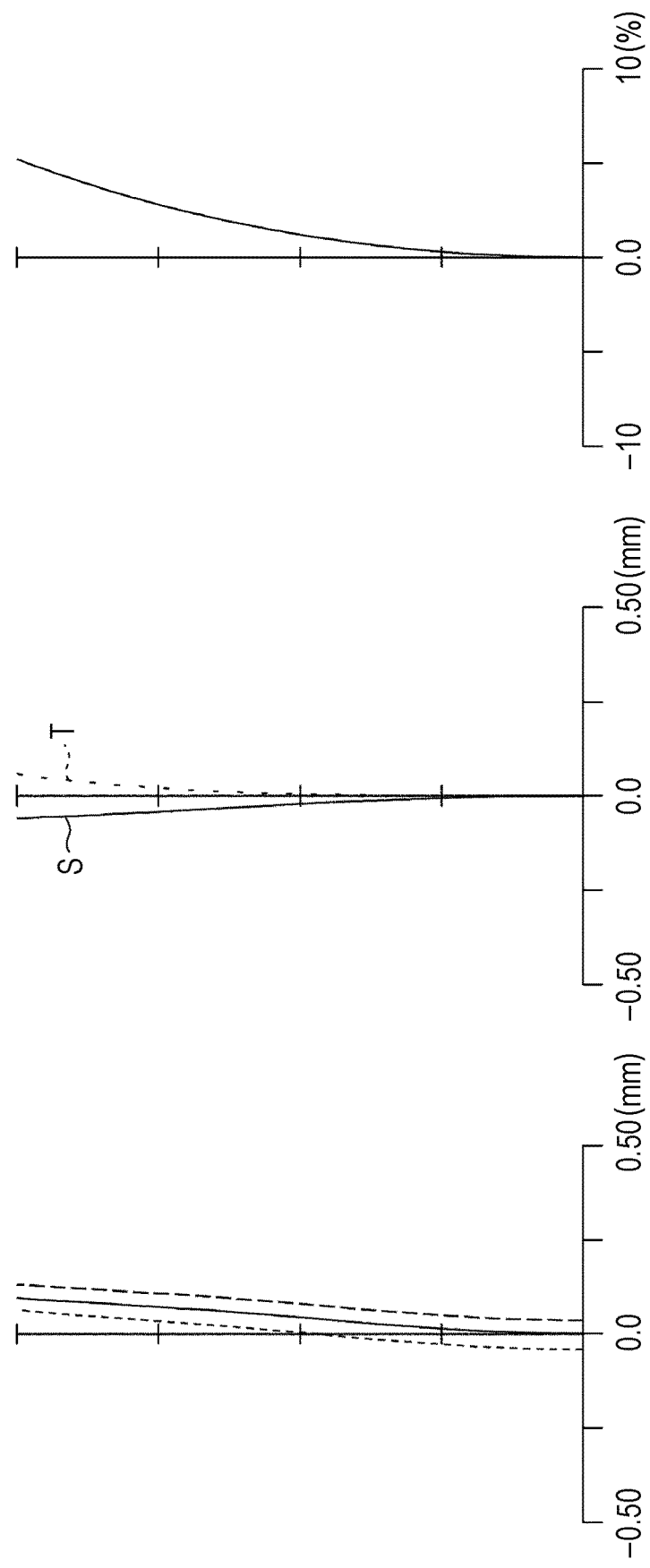
FIG. 11 is a diagram showing longitudinal aberrations of the zoom lens of Example 3 at infinity focusing in an intermediate focal length state.
Figure 12:
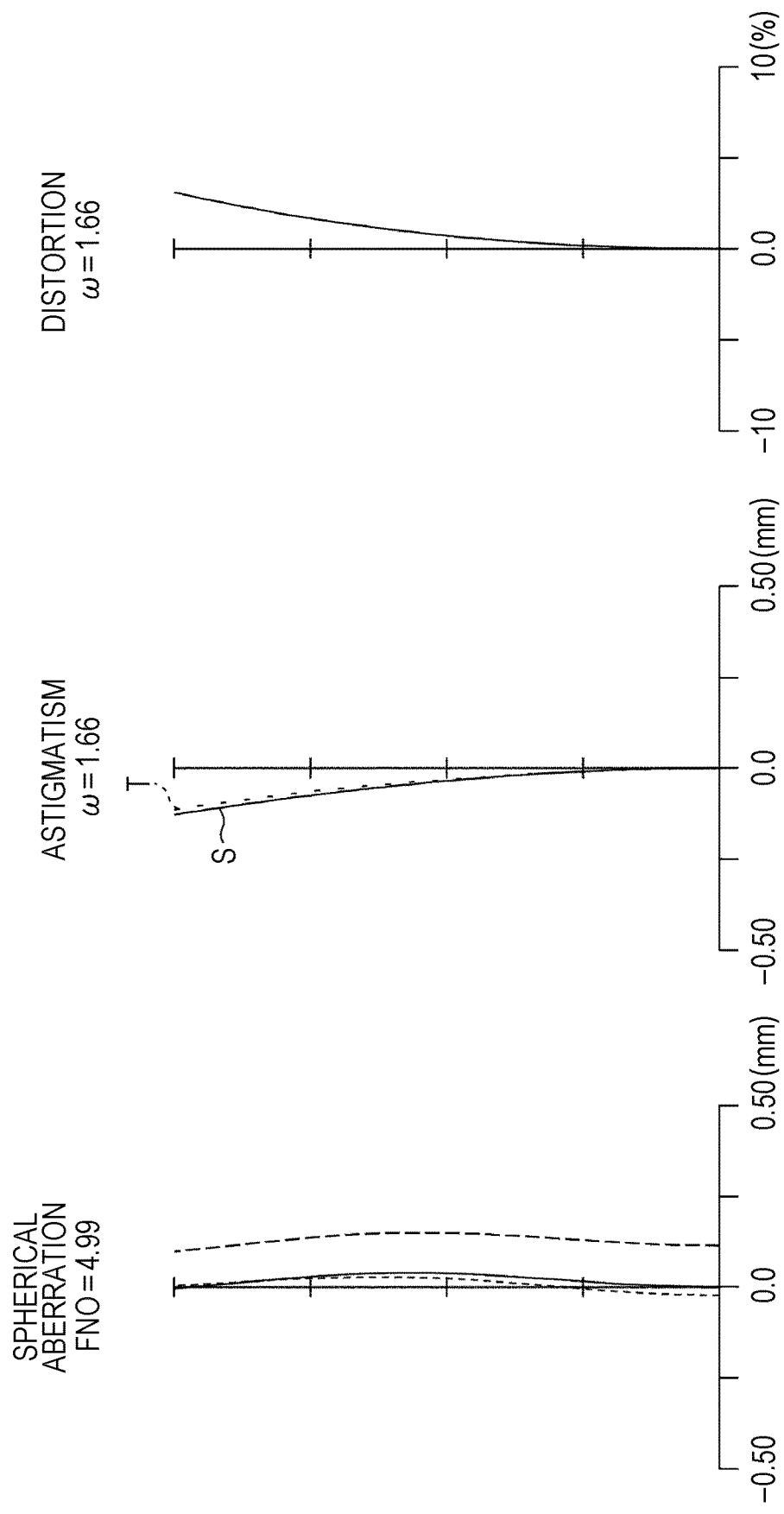
FIG. 12 is a diagram showing longitudinal aberrations of the zoom lens of Example 3 at infinity focusing at the telephoto end.

FIG. 9 is a diagram schematically showing an optical configuration of a zoom lens of Example 3 at the wide-angle end and the telephoto end at infinity focusing. FIGS. 10, 11, and 12 are diagrams showing longitudinal aberrations at the wide-angle end, the intermediate focal length state, and the telephoto end of the zoom lens of Example 3 at infinity focusing, respectively. The zoom lens of Example 3 includes, in order from the object side, a first lens group G1 having a positive refractive power, a second lens group G2 having a negative refractive power, a third lens group G3 having a positive refractive power, a fourth lens group G4 having a negative refractive power, a fifth lens group G5 having a positive refractive power, and a sixth lens group G6 having a negative refractive power. A stop S is arranged between the lens group G2 and the lens group G3. In the zoom lens of Example 3, the fourth lens group G4 is the focus group. The third lens group G3, the fourth lens group G4, the fifth lens group G5, and the sixth lens group G6 correspond to the above-mentioned rear group.

The zoom lens of Example 3 performs the variable magnification operation by changing the air space between the lens groups. At the variable magnification from the wide-angle end to the intermediate focal length state, the first lens group G1 and the third lens group G3 do not move, and the second lens group G2, the fourth lens group G4, the fifth lens group G5, and the sixth lens group G6 move to the image side. At the variable magnification from the intermediate focal length state to the telephoto end, the first lens group G1 and the third lens group G3 do not move, and the second lens group G2, the fifth lens group G5, and the sixth lens group G6 move to the image side, and the fourth lens group G4 moves to the object side. The lens group having the highest positive refractive power in the moving lens group in the rear group is the fifth lens group G5, and the lens group having the highest negative refractive power in the moving lens group in the rear group is the fourth lens group G4.

Table 9 is a table of surface data of the zoom lens of Example 3. In Table 9, Nos. 1 to 7 are surface numbers of the first lens group G1, Nos. 8 to 14 are surface numbers of the second lens group G2, and No. 15 indicates the stop. Nos. 16 to 20 are surface numbers of the third lens group G3, Nos. 21 to 23 are surface numbers of the fourth lens group G4, and Nos. 24 and 25 are surface numbers of the fifth lens group G5. Nos. 26 to 28 are surface numbers of the sixth lens group G6, No. 26 is the lens surface on the object side of the lens arranged closest to the image side, and No. 28 is the lens surface on the image side of the lens arranged closest to the image side. Nos. 29 and 30 indicate the cover glass CG, and No. 31 indicates the image plane.

TABLE 9

| No. | r | d | Nd | vd | H |
|---|---|---|---|---|---|
| 1 | 110.8777 | 1.1000 | 1.84666 | 23.78 | 21.11 |
| 2 | 57.2759 | 6.3000 | 1.49700 | 81.61 | 20.00 |
| 3 | -1000.0000 | 0.1500 | | | 21.54 |
| 4 | 53.5714 | 5.0500 | 1.49700 | 81.61 | 19.59 |
| 5 | 414.6051 | 0.1500 | | | 18.16 |
| 6 | 43.6276 | 3.2000 | 1.69680 | 55.46 | 17.31 |
| 7 | 78.0373 | D(7) | | | 16.88 |
| 8 | 49.8365 | 0.7000 | 1.91082 | 35.25 | 9.98 |
| 9 | 12.1159 | 3.8921 | | | 8.13 |
| 10 | -62.7416 | 0.7000 | 1.90043 | 37.37 | 8.01 |
| 11 | 14.0000 | 3.3000 | 1.98612 | 16.48 | 7.47 |
| 12 | 230.7878 | 1.1841 | | | 7.25 |
| 13 * | -26.6038 | 0.8000 | 1.85370 | 40.60 | 7.20 |
| 14 * | -500.0000 | D(14) | | | 7.16 |
| 15 S | INF | 0.6000 | | | 8.62 |
| 16 * | 29.9972 | 3.8000 | 1.59201 | 67.02 | 8.93 |
| 17 * | -35.1871 | 0.1500 | | | 8.93 |
| 18 | 19.2664 | 0.6000 | 1.92286 | 18.90 | 8.62 |
| 19 | 14.5901 | 6.0000 | 1.43700 | 95.10 | 8.29 |
| 20 | -24.5513 | D(20) | | | 7.96 |
| 21 | -53.0433 | 1.7000 | 1.95906 | 17.47 | 6.97 |
| 22 | -25.8545 | 0.6000 | 1.69680 | 55.46 | 6.80 |
| 23 | 15.1417 | D(23) | | | 6.23 |
| 24 * | 25.6779 | 4.0000 | 1.59201 | 67.02 | 6.02 |
| 25 * | -13.2002 | D(25) | | | 6.07 |
| 26 | -26.2925 | 0.6000 | 1.83481 | 42.72 | 5.93 |
| 27 | 12.1482 | 5.9500 | 1.55032 | 75.50 | 5.92 |
| 28 | -14.1970 | D(28) | | | 6.24 |
| 29 | INF | 2.4000 | 1.51680 | 64.20 | 5.04 |
| 30 | INF | 1.6809 | | | 4.84 |
| 31 | INF | | | | |

Table 10 shows the specifications of the zoom lens of Example 3. Table 11 is a table showing aspheric coefficients of aspheric surfaces in the zoom lens of Example 3. Table 12 shows focal lengths of the lens groups constituting the zoom lens of Example 3.

TABLE 10

| f | 6.7560 | 78.6762 | 155.8895 |
|---|---|---|---|
| FNO | 1.6473 | 4.3760 | 4.9900 |
| ω | 32.8557 | 3.2148 | 1.6566 |
| D(7) | 0.9550 | 32.3100 | 37.2374 |
| D(14) | 37.5827 | 6.2275 | 1.3000 |
| D(20) | 1.4206 | 13.7269 | 9.6969 |
| D(23) | 14.6753 | 5.7776 | 13.0033 |
| D(25) | 0.1219 | 0.1200 | 0.1237 |
| D(28) | 10.2161 | 6.8089 | 3.6095 |

TABLE 11

| No. | K | A4 | A6 | A8 | A10 |
|---|---|---|---|---|---|
| 13 | -7.28804E+00 | 7.13671E-05 | -1.24806E-06 | -2.35518E-08 | 3.61520E-10 |
| 14 | 1.00000E+01 | 1.07445E-04 | -1.90718E-06 | 5.73782E-10 | -3.95909E-11 |
| 16 | -3.02312E-01 | -1.17753E-05 | -1.98743E-07 | 2.01342E-09 | -1.78226E-12 |
| 17 | 3.34844E+00 | 4.05294E-05 | -1.53849E-07 | 2.10931E-09 | -1.10167E-12 |
| 24 | -7.98700E-01 | -1.27588E-05 | 2.64659E-07 | -3.23247E-09 | 1.02160E-10 |
| 25 | -1.47948E+00 | 9.04669E-05 | -2.78129E-07 | -1.15104E-08 | 3.25362E-10 |

TABLE 11-continued

| No. | A12 | A14 | A16 | A18 | A20 |
|---|---|---|---|---|---|
| 13 | −1.13820E−12 | 0.00000E+00 | 0.00000E+00 | 0.00000E+00 | 0.00000E+00 |
| 14 | 1.53642E−12 | 0.00000E+00 | 0.00000E+00 | 0.00000E+00 | 0.00000E+00 |
| 16 | 0.00000E+00 | 0.00000E+00 | 0.00000E+00 | 0.00000E+00 | 0.00000E+00 |
| 17 | 0.00000E+00 | 0.00000E+00 | 0.00000E+00 | 0.00000E+00 | 0.00000E+00 |
| 24 | −2.46570E−12 | 0.00000E+00 | 0.00000E+00 | 0.00000E+00 | 0.00000E+00 |
| 25 | −4.29435E−12 | 0.00000E+00 | 0.00000E+00 | 0.00000E+00 | 0.00000E+00 |

TABLE 12

| Lens group | Surface number | Focal length |
|---|---|---|
| G1 | 1-7 | 58.1668 |
| G2 | 8-14 | −8.6581 |
| G3 | 16-20 | 15.8453 |
| G4 | 21-23 | −18.2998 |
| G5 | 24-25 | 15.3124 |
| G6 | 26-28 | −124.964 |

Example 4

Figure 13:
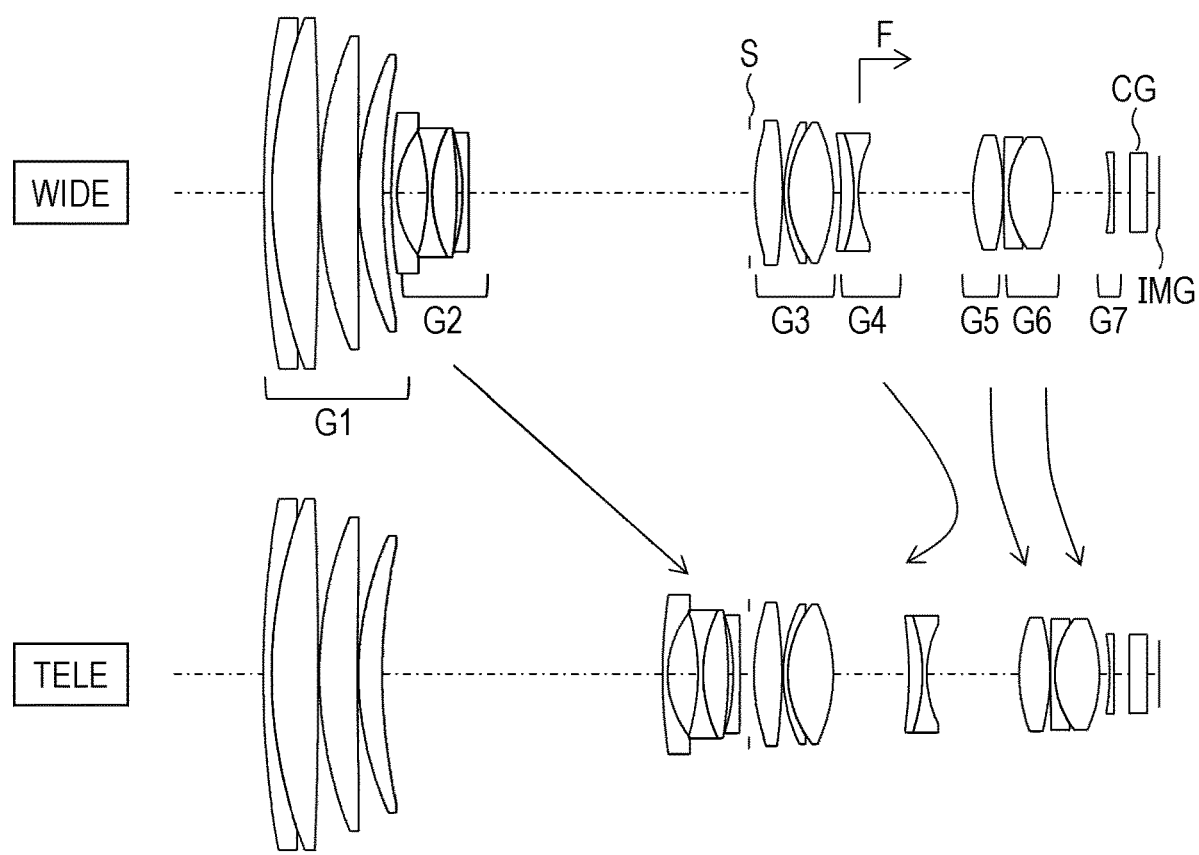
FIG. 13 is a diagram schematically showing an optical configuration of a zoom lens of Example 4 at infinity focusing at a wide-angle end and a telephoto end.
Figure 14:
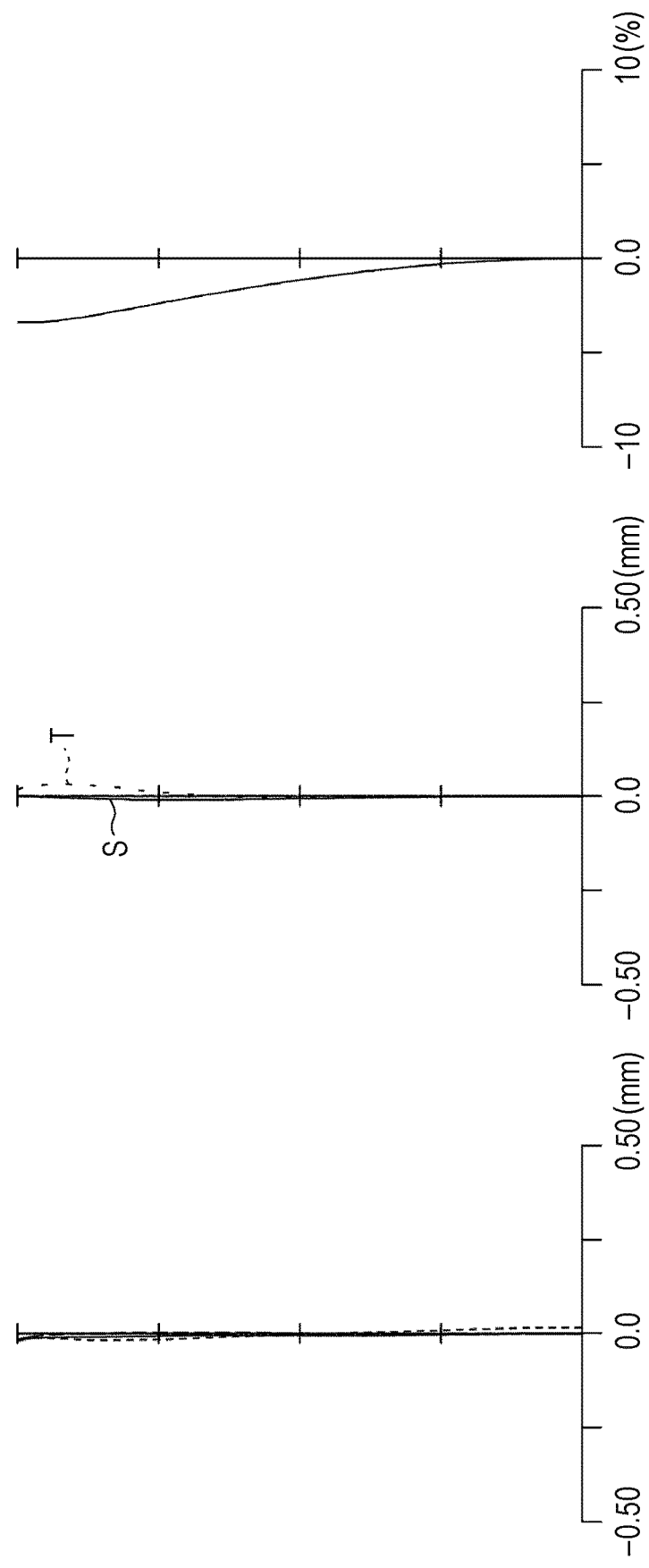
FIG. 14 is a diagram showing longitudinal aberrations of the zoom lens of Example 4 at infinity focusing at the wide-angle end.
Figure 15:
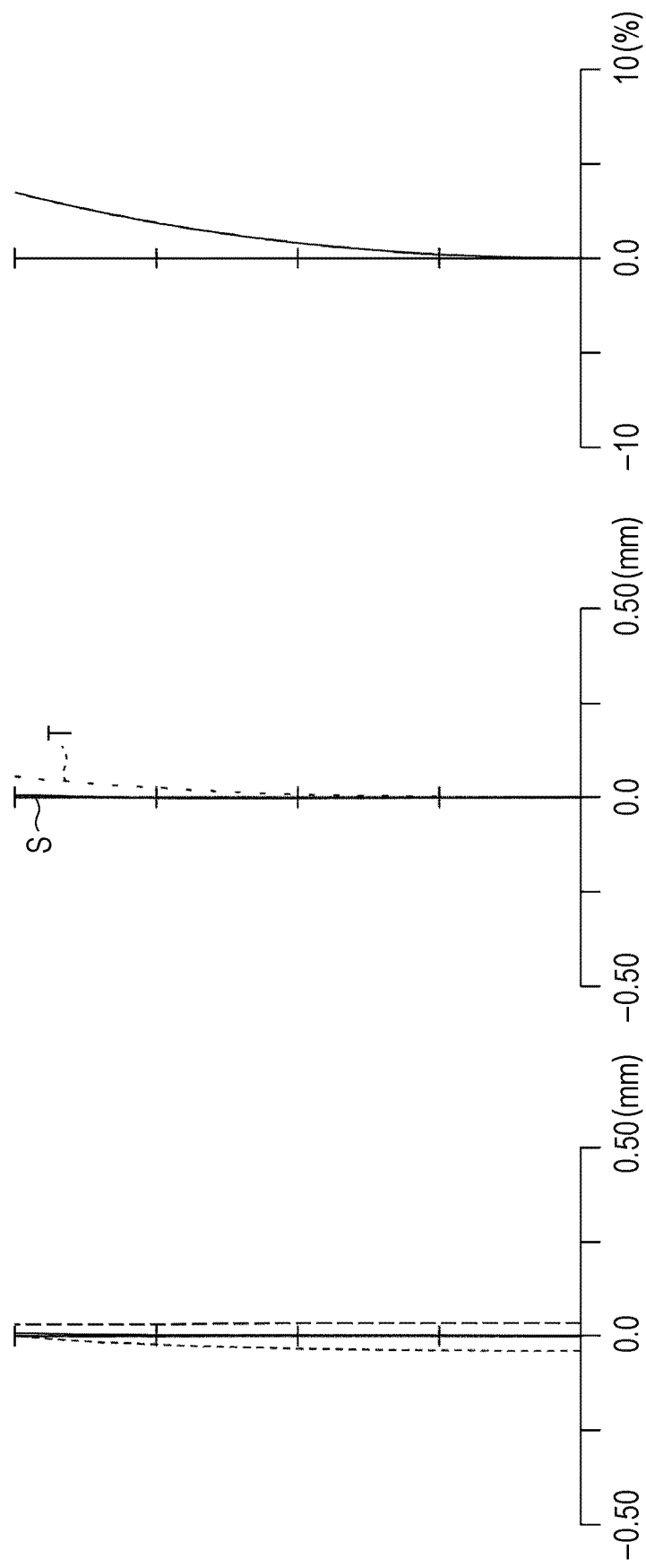
FIG. 15 is a diagram showing longitudinal aberrations of the zoom lens of Example 4 at infinity focusing in an intermediate focal length state.
Figure 16:
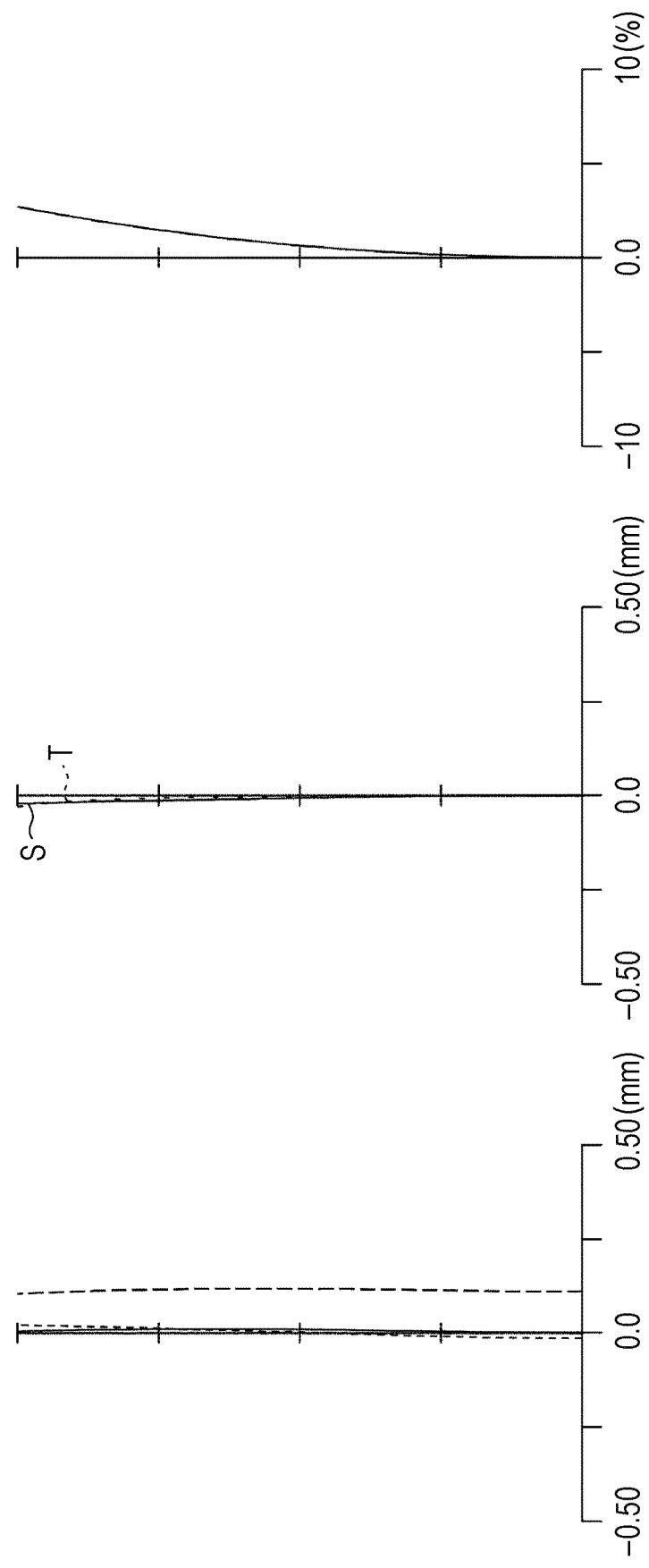
FIG. 16 is a diagram showing longitudinal aberrations of the zoom lens of Example 4 at infinity focusing at the telephoto end.

FIG. 13 is a diagram schematically showing an optical configuration of a zoom lens of Example 4 at infinity focusing at the wide-angle end and the telephoto end. FIGS. 14, 15, and 16 are diagrams showing longitudinal aberrations at the wide-angle end, the intermediate focal length state, and the telephoto end of the zoom lens of Example 4 at infinity focusing, respectively. The zoom lens of Example 4 includes, in order from the object side, a first lens group G1 having a positive refractive power, a second lens group G2 having a negative refractive power, a third lens group G3 having a positive refractive power, a fourth lens group G4 having a negative refractive power, a fifth lens group G5 having a positive refractive power, a sixth lens group G6 having a positive refractive power, and a seventh lens group G7 having a negative refractive power. A stop S is arranged between the lens group G2 and the lens group G3. In the zoom lens of Example 4, the fourth lens group G4 is the focus group. The third lens group G3, the fourth lens group G4, the fifth lens group G5, the sixth lens group G6, and the seventh lens group G7 correspond to the above-mentioned rear group.

The zoom lens of Example 4 performs the variable magnification operation by changing the air space between the lens groups. At the variable magnification from the wide-angle end to the intermediate focal length state, the first lens group G1, the third lens group G3, and the seventh lens group G7 do not move, and the second lens group G2, the fourth lens group G4, the fifth lens group G5, and the sixth lens group G6 move to the image side. At the variable magnification from the intermediate focal length state to the telephoto end, the first lens group G1, the third lens group G3, and the seventh lens group G7 do not move, the second lens group G2, the fifth lens group G5, and the sixth lens group G6 move to the image side, and the fourth lens group G4 moves to the object side. The lens group having the highest positive refractive power in the moving lens group in the rear group is the fifth lens group G5, and the lens group having the highest negative refractive power in the moving lens group in the rear group is the fourth lens group G4.

Table 13 is a table of surface data of the zoom lens of Example 4. In Table 13, Nos. 1 to 7 are surface numbers of the first lens group G1, Nos. 8 to 14 are surface numbers of the second lens group G2, and No. 15 indicates the stop. Nos. 16 to 20 are surface numbers of the third lens group G3, Nos. 21 to 23 are surface numbers of the fourth lens group G4, Nos. 24 and 25 are surface numbers of the fifth lens group G5, and Nos. 26 to 28 are surface numbers of the sixth lens group G6. Nos. 29 and 30 are surface numbers of the seventh lens group G7, No. 29 is the lens surface on the object side of the lens arranged closest to the image side, and No. 30 is the lens surface on the image side of the lens arranged closest to the image side. Nos. 31 and 32 indicate the cover glass CG, and No. 33 indicates the image plane.

TABLE 13

| No. | r | d | Nd | νd | H |
|---|---|---|---|---|---|
| 1 | 134.1572 | 1.1000 | 1.84666 | 23.78 | 21.83 |
| 2 | 62.6441 | 6.3000 | 1.49700 | 81.61 | 20.63 |
| 3 | −592.3774 | 0.1500 | | | 21.46 |
| 4 | 55.4996 | 5.0500 | 1.49700 | 81.61 | 19.57 |
| 5 | 864.2954 | 0.1500 | | | 18.09 |
| 6 | 44.6647 | 3.2000 | 1.69680 | 55.46 | 17.23 |
| 7 | 83.4755 | D(7) | | | 16.81 |
| 8 | 75.7835 | 0.7000 | 1.91082 | 35.25 | 9.73 |
| 9 | 13.3815 | 4.0392 | | | 8.00 |
| 10 | −29.4609 | 0.7000 | 1.90043 | 37.37 | 7.82 |
| 11 | 19.5676 | 3.3000 | 1.98612 | 16.48 | 7.48 |
| 12 | −57.7646 | 0.7546 | | | 7.32 |
| 13 * | −24.4633 | 0.8000 | 1.85370 | 40.60 | 7.25 |
| 14 * | −346.1876 | D(14) | | | 7.17 |
| 15 S | INF | 0.6000 | | | 8.40 |
| 16 * | 25.9093 | 3.8000 | 1.59201 | 67.02 | 8.72 |
| 17 * | −46.8441 | 0.1500 | | | 8.72 |
| 18 | 21.6811 | 0.6000 | 1.92286 | 18.90 | 8.51 |
| 19 | 15.4025 | 6.0000 | 1.43700 | 95.10 | 8.21 |
| 20 | −21.6361 | D(20) | | | 7.96 |
| 21 | −50.2621 | 1.7000 | 1.95906 | 17.47 | 7.16 |
| 22 | −24.8423 | 0.6000 | 1.69680 | 55.46 | 7.02 |
| 23 | 15.8576 | D(23) | | | 6.48 |
| 24 * | 21.5323 | 4.0000 | 1.59201 | 67.02 | 6.93 |
| 25 * | −23.4435 | D(25) | | | 6.93 |
| 26 | 1641.7241 | 0.6000 | 1.83481 | 42.72 | 6.76 |
| 27 | 12.3201 | 5.9500 | 1.55032 | 75.50 | 6.57 |
| 28 | −17.4104 | D(28) | | | 6.63 |
| 29 | −32.1928 | 0.6000 | 2.00069 | 25.46 | 4.90 |
| 30 | −30000.0000 | 2.0000 | | | 4.88 |
| 31 | INF | 2.4000 | 1.51680 | 64.20 | 4.79 |
| 32 | INF | 1.6255 | | | 4.72 |
| 33 | INF | | | | |

Table 14 shows the specifications of the zoom lens of Example 4. Table 15 is a table showing aspheric coefficients of aspheric surfaces in the zoom lens of Example 4. Table 16 shows focal lengths of the lens groups constituting the zoom lens of Example 4.

TABLE 14

| f | 6.7582 | 78.8393 | 156.0496 |
|---|---|---|---|
| FNO | 1.6473 | 4.3760 | 4.9900 |
| ω | 35.4566 | 3.2622 | 1.6617 |
| D(7) | 1.1251 | 32.1702 | 37.3585 |

TABLE 14-continued

| | | | |
|---|---|---|---|
| D(14) | 37.5334 | 6.4883 | 1.3000 |
| D(20) | 0.9935 | 14.4336 | 10.3298 |
| D(23) | 15.3179 | 5.7809 | 12.3186 |
| D(25) | 0.2730 | 0.1151 | 0.0972 |
| D(28) | 7.4612 | 3.7161 | 1.3000 |

TABLE 15

| No. | K | A4 | A6 | A8 | A10 |
|---|---|---|---|---|---|
| 13 | −7.28949E+00 | 2.37103E−05 | −1.39353E−06 | −2.85038E−09 | 2.78197E−10 |
| 14 | −1.00000E+01 | 7.33019E−05 | −1.71815E−06 | 4.43017E−09 | 1.75819E−10 |
| 16 | −3.01150E−01 | −1.18100E−05 | −1.85179E−07 | 3.67923E−09 | −4.01292E−11 |
| 17 | 3.56817E+00 | 4.04548E−05 | −1.39892E−07 | 3.48468E−09 | −3.79760E−11 |
| 24 | −2.34821E+00 | 9.18004E−06 | 1.20990E−07 | −5.27601E−09 | 1.49508E−10 |
| 25 | −2.41344E+00 | 4.89928E−05 | 5.61677E−08 | −9.42465E−09 | 2.18601E−10 |

| No. | A12 | A14 | A16 | A18 | A20 |
|---|---|---|---|---|---|
| 13 | −1.97442E−12 | 0.00000E+00 | 0.00000E+00 | 0.00000E+00 | 0.00000E+00 |
| 14 | −1.37632E−12 | 0.00000E+00 | 0.00000E+00 | 0.00000E+00 | 0.00000E+00 |
| 16 | 0.00000E+00 | 0.00000E+00 | 0.00000E+00 | 0.00000E+00 | 0.00000E+00 |
| 17 | 0.00000E+00 | 0.00000E+00 | 0.00000E+00 | 0.00000E+00 | 0.00000E+00 |
| 24 | −1.81625E−12 | 0.00000E+00 | 0.00000E+00 | 0.00000E+00 | 0.00000E+00 |
| 25 | −2.28290E−12 | 0.00000E+00 | 0.00000E+00 | 0.00000E+00 | 0.00000E+00 |

TABLE 16

| Lens group | Surface number | Focal length |
|---|---|---|
| G1 | 1-7 | 57.9741 |
| G2 | 8-14 | −9.04893 |
| G3 | 16-20 | 16.5165 |
| G4 | 21-23 | −18.8153 |
| G5 | 24-25 | 19.6069 |
| G6 | 26-28 | 85.0052 |
| G7 | 29-30 | −32.2053 |

Example 5

Figure 17:
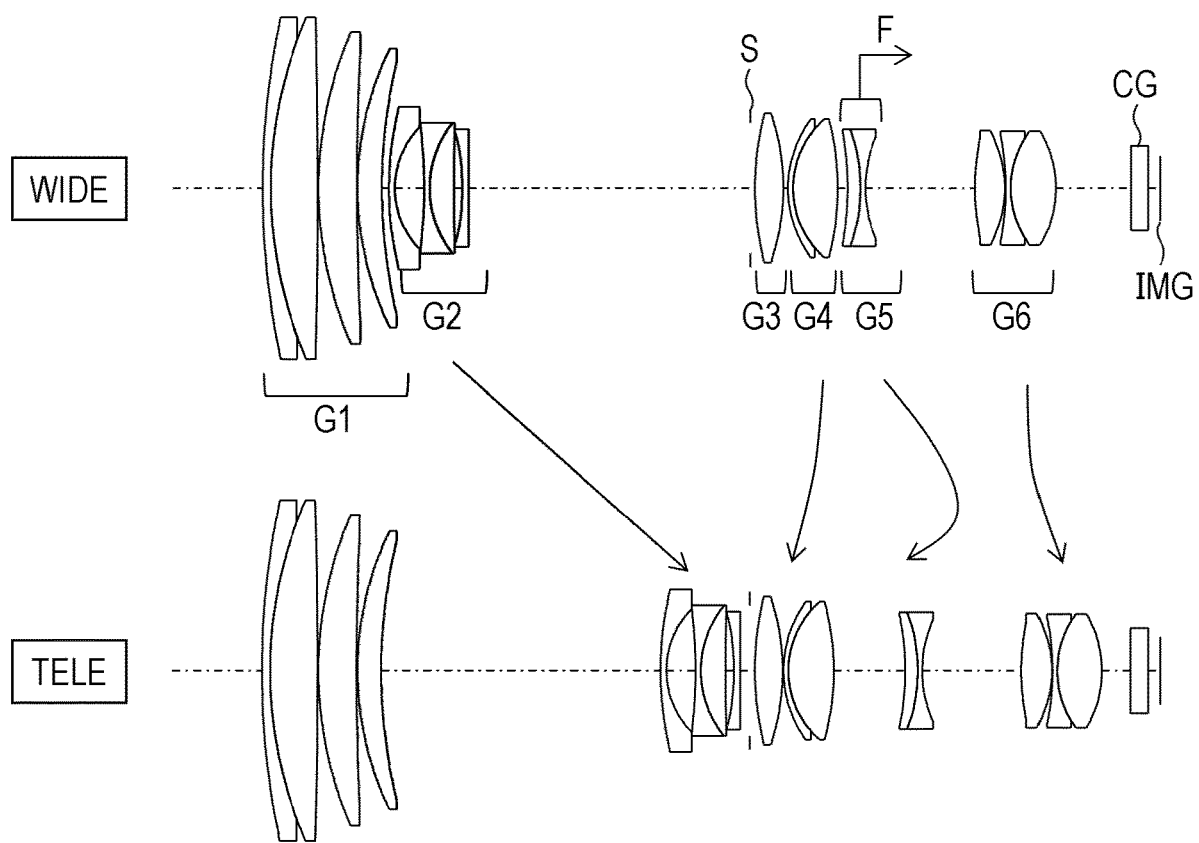
FIG. 17 is a diagram schematically showing an optical configuration of a zoom lens of Example 5 at infinity focusing at a wide-angle end and a telephoto end.
Figure 18:
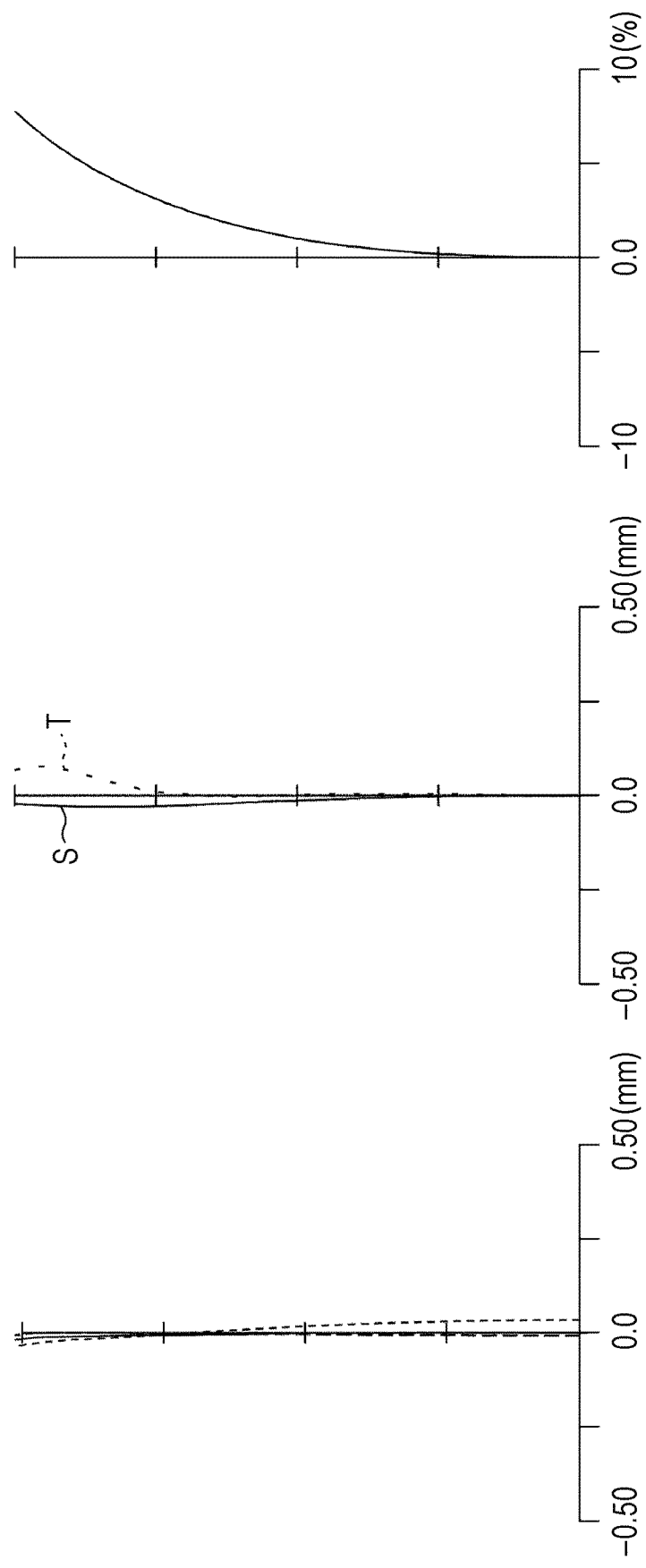
FIG. 18 is a diagram showing longitudinal aberrations of the zoom lens of Example 5 at infinity focusing at the wide-angle end.
Figure 19:
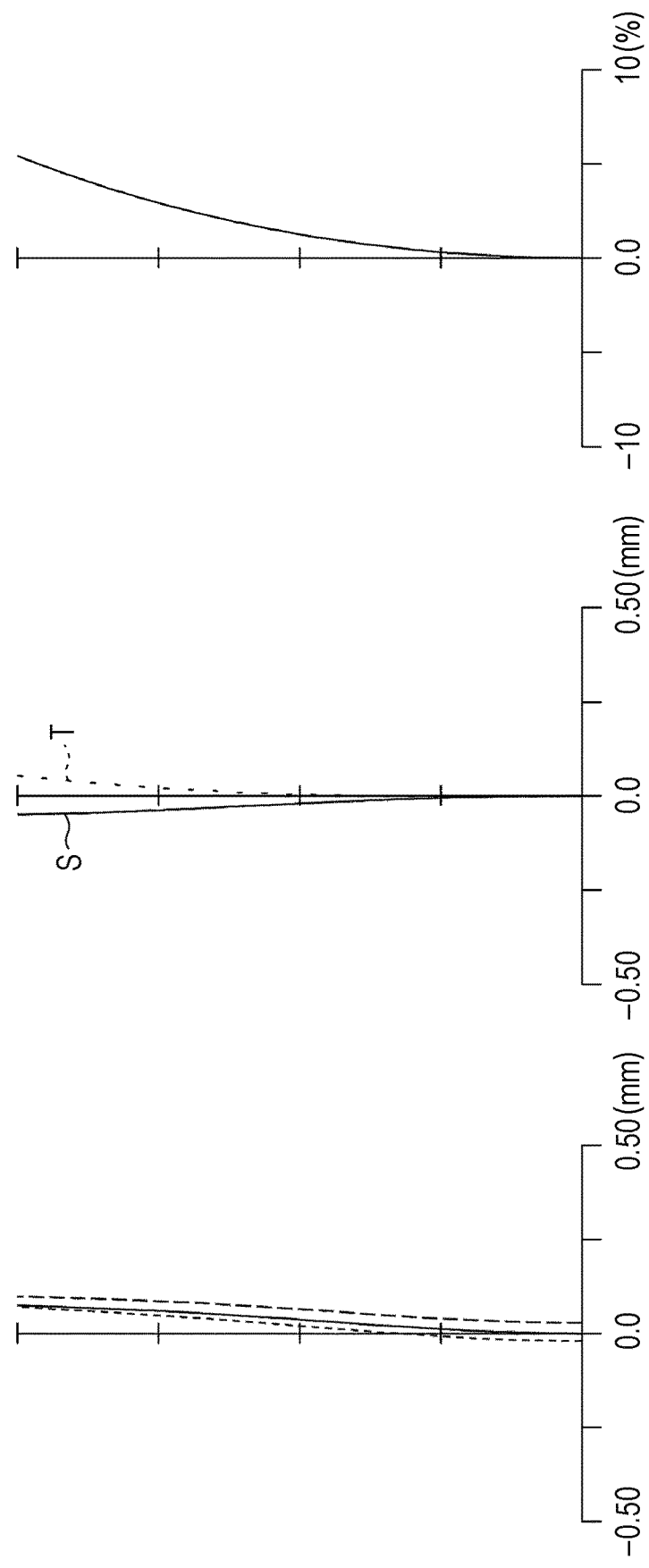
FIG. 19 is a diagram showing longitudinal aberrations of the zoom lens of Example 5 at infinity focusing in an intermediate focal length state.
Figure 20:
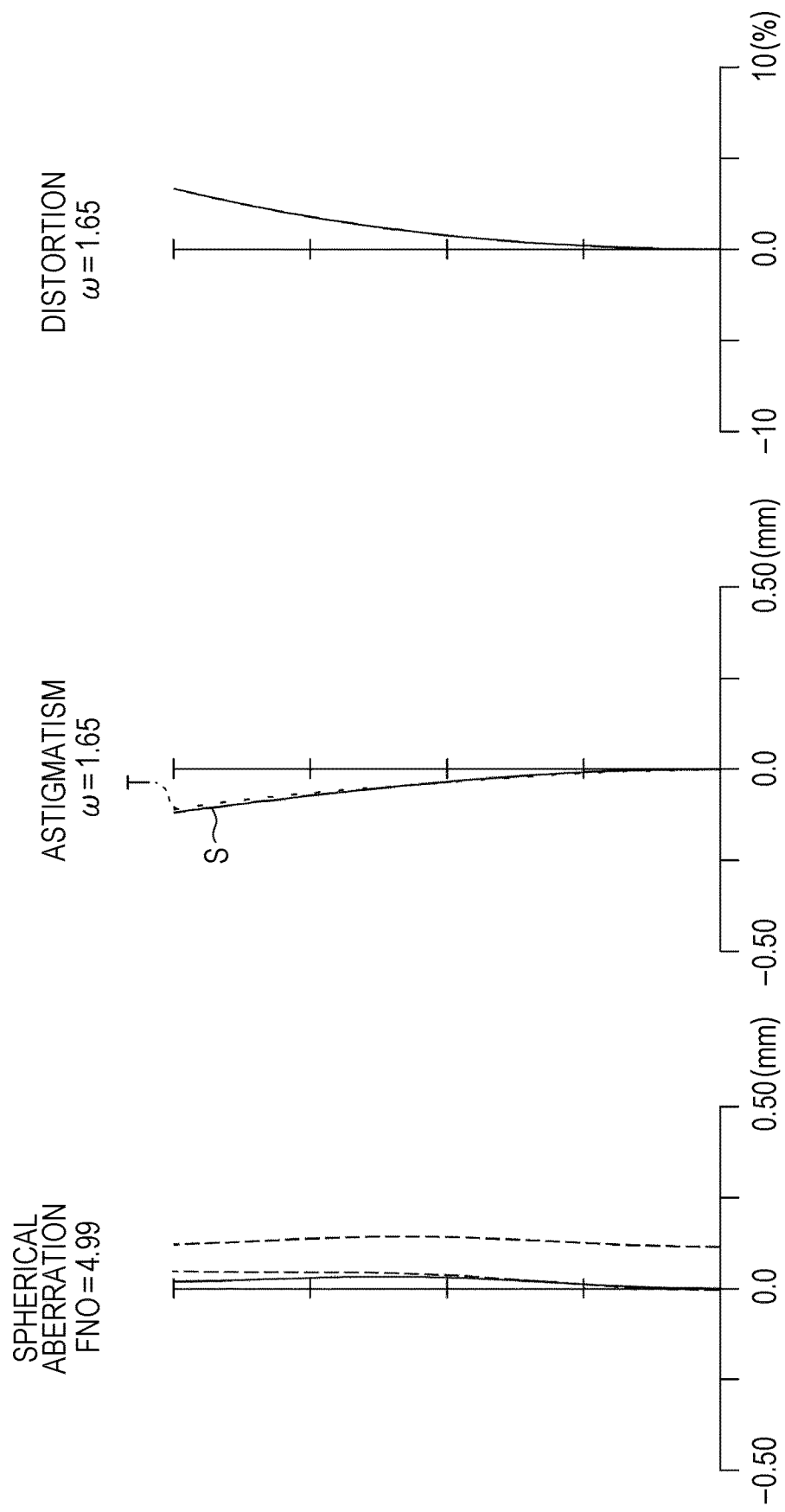
FIG. 20 is a diagram showing longitudinal aberrations of the zoom lens of Example 5 at infinity focusing at the telephoto end.

FIG. 17 is a diagram schematically showing an optical configuration of a zoom lens of Example 5 at the wide-angle end and the telephoto end at infinity focusing. FIGS. 18, 19, and 20 are diagrams showing longitudinal aberrations at the wide-angle end, the intermediate focal length state, and the telephoto end of the zoom lens of Example 5 at infinity focusing, respectively. The zoom lens of Example 5 includes, in order from the object side, a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power. A stop S is arranged between the lens group G2 and the lens group G3. In the zoom lens of Example 5, the fifth lens group G5 is the focus group. The third lens group G3, the fourth lens group G4, the fifth lens group G5, and the sixth lens group G6 correspond to the above-mentioned rear group.

The zoom lens of Example 5 performs the variable magnification operation by changing the air space between the lens groups. At the variable magnification from the wide-angle end to the intermediate focal length state, the first lens group G1 and the third lens group G3 do not move, the second lens group G2, the fifth lens group G5, and the sixth lens group G6 move to the image side, and the fourth lens group G4 moves to the object side. At the variable magnification from the intermediate focal length state to the telephoto end, the first lens group G1 and the third lens group G3 do not move, the second lens group G2 and the sixth lens group G6 move to the image side, and the fourth lens group G4 and the fifth lens group G5 move to the object side. The lens group having the highest positive refractive power in the moving lens group in the rear group is the sixth lens group G6, and the lens group having the highest negative refractive power in the moving lens group in the rear group is the fifth lens group G5.

Table 17 is a table of surface data of the zoom lens of Example 5. In Table 17, Nos. 1 to 7 are surface numbers of the first lens group G1, Nos. 8 to 14 are surface numbers of the second lens group G2, and No. 15 indicates the stop. Nos. 16 and 17 are surface numbers of the third lens group G3, Nos. 18 to 20 are surface numbers of the fourth lens group G4, and Nos. 21 to 23 are surface numbers of the fifth lens group G5. Nos. 24 to 28 are surface numbers of the sixth lens group G6, No. 26 is the lens surface on the object side of the lens arranged closest to the image side, and No. 28 is the lens surface on the image side of the lens arranged closest to the image side. Nos. 29 and 30 indicate the cover glass CG, and No. 31 indicates the image plane.

TABLE 17

| No. | r | d | Nd | νd | H |
|---|---|---|---|---|---|
| 1 | 109.1380 | 1.1000 | 1.84666 | 23.78 | 20.92 |
| 2 | 56.8734 | 6.3000 | 1.49700 | 81.61 | 19.83 |
| 3 | −981.7909 | 0.1500 | | | 21.35 |
| 4 | 52.4880 | 5.0500 | 1.49700 | 81.61 | 19.46 |
| 5 | 335.5388 | 0.1500 | | | 18.15 |
| 6 | 42.7719 | 3.2000 | 1.69680 | 55.46 | 17.30 |
| 7 | 75.2835 | D(7) | | | 16.86 |
| 8 | 46.9493 | 0.7000 | 1.91082 | 35.25 | 9.89 |
| 9 | 11.6746 | 3.9499 | | | 8.02 |
| 10 | −61.2362 | 0.7000 | 1.90043 | 37.37 | 7.91 |
| 11 | 14.0000 | 3.3000 | 1.98612 | 16.48 | 7.41 |
| 12 | 341.3233 | 1.1114 | | | 7.20 |
| 13 * | −27.0050 | 0.8000 | 1.85370 | 40.60 | 7.15 |
| 14 * | −500.0000 | D(14) | | | 7.12 |
| 15 S | INF | 0.6000 | | | 8.61 |
| 16 * | 36.5250 | 3.8000 | 1.59201 | 67.02 | 9.02 |
| 17 * | −28.5123 | D(17) | | | 9.05 |
| 18 | 15.9644 | 0.6000 | 1.92286 | 18.90 | 8.41 |
| 19 | 12.3100 | 6.0000 | 1.43700 | 95.10 | 8.02 |
| 20 | −36.3815 | D(20) | | | 7.64 |
| 21 | −41.3277 | 1.7000 | 1.95906 | 17.47 | 7.12 |
| 22 | −22.9298 | 0.6000 | 1.69680 | 55.46 | 7.01 |
| 23 | 16.5718 | D(23) | | | 6.53 |
| 24 * | 32.3580 | 4.0000 | 1.59201 | 67.02 | 6.87 |
| 25 * | −13.2828 | 0.1000 | | | 6.94 |

TABLE 17-continued

| No. | r | d | Nd | vd | H |
|---|---|---|---|---|---|
| 26 | −34.0709 | 0.6000 | 1.83481 | 42.72 | 6.71 |
| 27 | 12.7747 | 5.9500 | 1.55032 | 75.50 | 6.65 |
| 28 | −14.9040 | D(28) | | | 6.87 |
| 29 | INF | 2.4000 | 1.51680 | 64.20 | 5.15 |
| 30 | INF | 1.6285 | | | 4.91 |
| 31 | INF | | | | |

Table 18 shows the specifications of the zoom lens of Example 5. Table 19 is a table showing aspheric coefficients of aspheric surfaces in the zoom lens of Example 5. Table 20 shows focal lengths of the lens groups constituting the zoom lens of Example 5.

TABLE 18

| f | 6.7543 | 78.2486 | 155.8677 |
|---|---|---|---|
| FNO | 1.6473 | 4.3760 | 4.9900 |
| ω | 32.5662 | 3.2253 | 1.6534 |
| D(7) | 0.9550 | 32.2390 | 37.1781 |
| D(14) | 37.5228 | 6.2388 | 1.3000 |
| D(17) | 0.6342 | 0.1461 | 0.1000 |
| D(20) | 1.3310 | 13.6460 | 9.5776 |
| D(23) | 14.7191 | 5.8101 | 13.1992 |
| D(28) | 9.9245 | 7.0067 | 3.7325 |

TABLE 19

| No. | K | A4 | A6 | A8 | A10 |
|---|---|---|---|---|---|
| 13 | −1.00000E+00 | 8.24372E−05 | −1.57495E−06 | −2.57052E−08 | 3.53377E−10 |
| 14 | −1.00000E+00 | 1.29115E−04 | −2.26299E−06 | −3.45755E−09 | −5.40676E−12 |
| 16 | 2.53877E−01 | −9.64441E−06 | −2.06637E−07 | 1.69045E−09 | −3.20026E−12 |
| 17 | 3.40190E+00 | 3.83659E−05 | −1.34583E−07 | 1.77975E−09 | −9.96365E−13 |
| 24 | −3.99145E+00 | −2.12824E−05 | 2.41414E−07 | −4.00299E−09 | 1.46678E−10 |
| 25 | −1.30634E+00 | 8.47347E−05 | −2.27748E−07 | −9.68102E−09 | 2.49400E−10 |

| No. | A12 | A14 | A16 | A18 | A20 |
|---|---|---|---|---|---|
| 13 | −4.12094E−13 | 0.00000E+00 | 0.00000E+00 | 0.00000E+00 | 0.00000E+00 |
| 14 | 2.05108E−12 | 0.00000E+00 | 0.00000E+00 | 0.00000E+00 | 0.00000E+00 |
| 16 | 0.00000E+00 | 0.00000E+00 | 0.00000E+00 | 0.00000E+00 | 0.00000E+00 |
| 17 | 0.00000E+00 | 0.00000E+00 | 0.00000E+00 | 0.00000E+00 | 0.00000E+00 |
| 24 | −3.05431E−12 | 0.00000E+00 | 0.00000E+00 | 0.00000E+00 | 0.00000E+00 |
| 25 | −3.45085E−12 | 0.00000E+00 | 0.00000E100 | 0.00000E+00 | 0.00000E+00 |

TABLE 20

| Lens group | Surface number | Focal length |
|---|---|---|
| G1 | 1-7 | 58.1288 |
| G2 | 8-14 | −8.66361 |
| G3 | 16-17 | 27.6483 |
| G4 | 18-20 | 33.4555 |
| G5 | 21-23 | −18.3136 |
| G6 | 24-28 | 20.4381 |

Table 21 shows values calculated by the above-mentioned expressions in Examples 1 to 5 and numerical values used in the expressions.

TABLE 21

| | Example 1 | Example 2 | Example 3 | Example 4 | Example 5 |
|---|---|---|---|---|---|
| (1) $|f_f|/M$ | 0.56 | 0.58 | 0.56 | 0.58 | 0.56 |
| (2) $\beta_{FW}/\beta_{FT}$ | 2.04 | 3.26 | 2.03 | 3.30 | 1.96 |
| (3) $\beta_{2T}/\beta_{2W}$ | 10.77 | 10.44 | 10.73 | 10.38 | 10.73 |
| (4) $f_t/f_3$ | 9.83 | 9.44 | 9.84 | 9.45 | 5.64 |
| (5) $|f_1/f_2|$ | 6.68 | 6.41 | 6.72 | 6.41 | 6.71 |

TABLE 21-continued

| | Example 1 | Example 2 | Example 3 | Example 4 | Example 5 |
|---|---|---|---|---|---|
| (6) $\beta_{2W}$ | −0.22 | −0.23 | −0.22 | −0.23 | −0.22 |
| (7) $D_{2rw}/f_w$ | 5.65 | 5.64 | 5.65 | 5.64 | 5.64 |
| (8) $|m_2/f_2|$ | 4.17 | 4.00 | 4.19 | 4.00 | 4.18 |
| (9) $|f_p/f_n|$ | 1.14 | 0.96 | 0.84 | 1.04 | 1.12 |
| (10) $(R_{b1} - R_{b2})/(R_{b1} + R_{b2})$ | 0.33 | −1.00 | 0.30 | −1.00 | 0.39 |
| $f_w$ | 6.75 | 6.76 | 6.76 | 6.76 | 6.75 |
| $f_t$ | 155.86 | 156.05 | 155.89 | 156.05 | 155.87 |
| $f_f$ | −18.30 | −18.80 | −18.30 | −18.82 | −18.31 |
| $f_1$ | 58.11 | 57.94 | 58.17 | 57.97 | 58.13 |
| $f_2$ | −8.69 | −9.04 | −8.66 | −9.05 | −8.66 |
| $f_3$ | 15.85 | 16.52 | 15.85 | 16.52 | 27.65 |
| $\beta_{2W}$ | −0.22 | −0.23 | −0.22 | −0.23 | −0.22 |
| $\beta_{2T}$ | −2.34 | −2.36 | −2.32 | −2.34 | −2.33 |
| $\beta_{FW}$ | 6.03 | 9.88 | 6.02 | 9.93 | 5.85 |
| $\beta_{FT}$ | 2.96 | 3.03 | 2.97 | 3.01 | 2.99 |
| $D_{2rw}$ | 38.19 | 38.14 | 38.18 | 38.13 | 38.12 |
| $m_2$ | 36.28 | 36.22 | 36.27 | 36.21 | 36.21 |
| $f_p$ | 20.83 | 18.01 | 15.31 | 19.61 | 20.44 |
| $f_n$ | −18.30 | −18.80 | −18.30 | −18.82 | −18.31 |
| $R_{b1}$ | −28.14 | −32.17 | −26.29 | −32.19 | −34.07 |
| $R_{b2}$ | −14.22 | −30000.00 | −14.20 | −30000.00 | −14.90 |

What is claimed is:

1. A zoom lens that includes a first lens group having a positive refractive power, a second lens group having a negative refractive power, and a rear group having a positive refractive power as a whole in order from an object side, and performs a variable magnification operation by changing a distance between the lens groups adjacent to each other, wherein the rear group includes at least a third lens group, a fourth lens group, and a fifth lens group in order from the object side, any one lens group of the third lens group, the fourth lens group, or the fifth lens group is a focus group that performs focusing by moving on an optical axis, and the zoom lens satisfies a following expression:

$$0.3 \leq |f_f|/M < 0.8 \quad (1)$$

$$1.5 \leq \beta_{FW}/\beta_{FT} < 7.0 \quad (2)$$

where

M is a square root of a product of $f_w$ and $f_t$,
$f_f$ is a focal length of the focus group,
$f_w$ is a focal length at a wide-angle end of the zoom lens at infinity focusing,
$f_t$ is a focal length at a telephoto end of the zoom lens at infinity focusing, $\beta_{FW}$ is a lateral magnification at a wide-angle end of the focus group, and $\beta_{FT}$ is a lateral magnification at a telephoto end of the focus group.

2. The zoom lens according to claim 1, wherein the zoom lens satisfies a following expression:

$$5.0 \leq \beta_{2T}/\beta_{2W} \leq 40.0 \quad (3)$$

where $\beta_{2T}$ is a lateral magnification at a telephoto end of the second lens group, and $\beta_{2W}$ is a lateral magnification at a wide-angle end of the second lens group.

3. The zoom lens according to claim 1, wherein the third lens group has a positive refractive power, and the zoom lens satisfies a following expression:

$$5.0 \leq f/f_3 \leq 15.0 \quad (4)$$

where $f_3$ is a focal length of the third lens group.

4. The zoom lens according to claim 1, wherein the zoom lens satisfies a following expression:

$$3.0 \leq |f_1/f_2| \leq 10.0 \quad (5)$$

where $f_1$ is a focal length of the first lens group, and
$f_2$ is a focal length of the second lens group.

5. The zoom lens according to claim 1, wherein the zoom lens satisfies a following expression:

$$-0.4 \leq \beta_{2W} \leq -0.1 \quad (6)$$

where $\beta_{2W}$ is a lateral magnification at a wide-angle end of the second lens group.

6. The zoom lens according to claim 1, wherein the zoom lens satisfies a following expression:

$$3.0 \leq D_{2rw}/f_w \leq 9.0 \quad (7)$$

where $D_{2rw}$ is a distance on an optical axis between a lens surface of the second lens group closest to an image side at a wide-angle end of the zoom lens during infinity focusing and a lens surface of the third lens group closest to the object side.

7. The zoom lens according to claim 1, wherein the zoom lens satisfies a following expression:

$$2.0 \leq |m_2/f_2| \leq 6.0 \quad (8)$$

where $m_2$ is the amount of movement of the second lens group at variable magnification from a wide-angle end to a telephoto end, and $f_2$ is a focal length of the second lens group.

8. The zoom lens according to claim 1, wherein at least two lens groups of the rear group move on an optical axis at variable magnification from a wide-angle end to a telephoto end.

9. The zoom lens according to claim 8, wherein the moving lens groups of the rear group include at least one lens group having a positive refractive power and at least one lens group having a negative refractive power, and the zoom lens satisfies a following expression:

$$0.0 < |f_p/f_n| < 1.5 \quad (9)$$

where $f_p$ is a focal length of the lens group having the highest positive refractive power of the moving lens groups of the rear group, and $f_n$ is a focal length of the lens group having the highest negative refractive power of the moving lens groups of the rear group.

10. The zoom lens according to claim 1, wherein the zoom lens satisfies a following expression:

$$-2.0 < (R_{b1}-R_{b2})/(R_{b1}+R_{b2}) \leq 2.0 \quad (10)$$

where $R_{b1}$ is a radius of curvature of a surface on an object side of a lens arranged closest to the image side, and $R_{b2}$ is a radius of curvature of a surface on an image side of the lens arranged closest to the image side.

11. An imaging apparatus comprising:
the zoom lens according to claim 1; and
an image sensor that is provided on the image side of the zoom lens to convert an optical image formed by the zoom lens into an electrical signal.

* * * * *